(12) United States Patent
Araki

(10) Patent No.: US 10,939,017 B2
(45) Date of Patent: Mar. 2, 2021

(54) IMAGE FORMING APPARATUS

(71) Applicant: CANON KABUSHIKI KAISHA, Tokyo (JP)

(72) Inventor: Ryuichi Araki, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/752,177

(22) Filed: Jan. 24, 2020

(65) Prior Publication Data

US 2020/0244838 A1    Jul. 30, 2020

(30) Foreign Application Priority Data

Jan. 28, 2019   (JP) ................................. 2019-012075

(51) Int. Cl.
| | |
|---|---|
| *H04N 1/46* | (2006.01) |
| *H04N 1/60* | (2006.01) |
| *H04N 1/48* | (2006.01) |
| *H04N 1/00* | (2006.01) |

(52) U.S. Cl.
CPC ....... *H04N 1/6008* (2013.01); *H04N 1/00997* (2013.01); *H04N 1/486* (2013.01)

(58) Field of Classification Search
CPC ... H04N 1/6008; H04N 1/00997; H04N 1/486
See application file for complete search history.

(56) References Cited

U.S. PATENT DOCUMENTS

| | | | | |
|---|---|---|---|---|
| 2005/0030562 A1* | 2/2005 | Hama | ................ | G03G 15/5058 358/1.9 |
| 2009/0141296 A1* | 6/2009 | Ichinose | ............ | G03G 15/5058 358/1.9 |
| 2011/0043810 A1* | 2/2011 | Suzuki | ............... | G03G 15/5058 356/445 |
| 2011/0076040 A1* | 3/2011 | Uchidate | ............ | G03G 15/5058 399/49 |
| 2014/0079443 A1* | 3/2014 | Nanai | ................ | G03G 15/5058 399/301 |
| 2015/0043936 A1* | 2/2015 | Masuda | ............... | G03G 15/556 399/74 |
| 2015/0242714 A1* | 8/2015 | Oka | ........................ | B41J 29/393 358/1.5 |
| 2015/0261163 A1* | 9/2015 | Ishii | ................... | G03G 15/5062 250/559.16 |
| 2017/0185875 A1* | 6/2017 | Shimura | ............... | H04N 1/6091 |
| 2020/0057408 A1* | 2/2020 | Ishido | ........................ | G01J 1/06 |
| 2020/0081365 A1 | 3/2020 | Araki | | |

FOREIGN PATENT DOCUMENTS

JP      2013-120215 A     6/2013

\* cited by examiner

*Primary Examiner* — Cheukfan Lee
(74) *Attorney, Agent, or Firm* — Venable LLP

(57) ABSTRACT

An image forming apparatus includes an optical sensor configured to detect reflected light from a detection image formed on the transfer member. The optical sensor includes a light emitting element configured to emit light for irradiating the detection image at a predetermined angle of incidence, a first light receiving element arranged at a position at which diffused reflected light from the detection image is received at a first angle of reflection, and a second light receiving element arranged at a position at which the diffused reflected light from the detection image is received at a second angle of reflection.

9 Claims, 14 Drawing Sheets

COMPARATIVE EXAMPLE

COMPARATIVE EXAMPLE

IMAGE FORMING APPARATUS

BACKGROUND OF THE INVENTION

Field of the Invention

The present disclosure relates to an image forming apparatus including an optical sensor including a plurality of light emitting elements and a plurality of light receiving elements configured to receive reflected light of light emitted from the plurality of light emitting elements.

Description of the Related Art

An electrophotographic image forming apparatus is configured to form images of colors of yellow (Y), magenta (M), cyan (C), and black (K) on a sheet through electrophotographic processes of charging, exposing, developing, and transferring. Densities of the formed images are varied depending on temperature and humidity of the image forming apparatus, the number of prints by the image forming apparatus, and operating time of the image forming apparatus. To address this problem, the image forming apparatus is configured to form a test image for image density detection on an image bearing member, which is different from the sheet, detect the test image for image density detection by an optical sensor, and adjust a density based on the results of the detection.

The image forming apparatus is also configured to superimpose images of different colors to form an image of mixed colors. Therefore, in a case where image forming positions of the yellow image, the magenta image, the cyan image, and the black image are shifted, a tint of the image of the mixed colors does not become a desired tint. This is called "color misregistration". It is known that the color misregistration is also varied depending on the temperature and humidity of the image forming apparatus, the number of prints of the image forming apparatus, and the operating time of the image forming apparatus as with the densities of the images described above. In order to address this problem, before the tint of the color image is changed, the image forming apparatus forms pattern images for detecting the color misregistration on the image bearing member, detects the pattern images for detecting the color misregistration by the optical sensor, and adjusts the image forming positions of the respective colors based on a detected color misregistration amount.

The optical sensor included in the image forming apparatus includes a light emitter, and a light receiver configured to receive reflected light from the detection image (test image and pattern images) on the image bearing member. Methods of detecting the detection image by the optical sensor include a specularly reflected light method of detecting specularly reflected light from the detection image, and a diffused reflected light method (diffusely reflected light method) of detecting diffused reflected light from the detection image.

In Japanese Patent Application Laid-open No. 2013-120215, there is disclosed a method of detecting with high accuracy a position of a pattern image for detecting color misregistration. In this method, an angle of an end of the pattern image and an angle of an end of a detection region of an optical sensor are aligned, and further, a width of the detection region of the optical sensor and a width of a detection image are matched. As a result, a waveform of a signal as a detection result becomes triangular with the rising edge and the falling edge being the steepest. Such a signal is less susceptible to noise, and enables highly accurate detection of the position of the pattern image.

An electrophotographic image forming apparatus is configured to form images of respective colors on a plurality of photosensitive members, and transfer the images of respective colors from the photosensitive members onto a transfer member to be superimposed on one another. As a result, an image of mixed colors is formed on the transfer member. In a case where the image on the transfer member is transferred onto a sheet, an image is formed on the sheet. It is required of the image forming apparatus to support image formation on sheets of various materials. For that purpose, the transfer member has an elastic layer or a coating layer of a different material formed on the front surface thereof. As a result, image formation of high quality is achieved. Further, in order to suppress an increase in replacement cost, it is required of the transfer member to have a long life. In a case where the transfer member has a long life, the front surface is deteriorated to change reflection and light distribution characteristics thereof. This affects position detection in that an error in position detection may increase.

Specifically, the front surface of the transfer member is changed in a surface state including roughness and gloss due to a change with time. The surface state of the transfer member is affected by the number of sheets on which images are formed, toner use duty, a usage environment, and the like. As a result, a waveform of a detection signal as a result of detection by the optical sensor is distorted without becoming an ideal isosceles triangle. FIG. 20 is an explanatory graph of such distortion in the detection waveform. The image forming apparatus is configured to derive, as a barycenter, a midpoint of intersections between the waveform of the above-mentioned detection signal and a predetermined threshold. The derived barycenter is the position of the pattern image for detecting the color misregistration. In a case where the waveform of the detection signal is distorted, the pattern image is displaced by an error $\delta$.

The present disclosure has been made in view of the above-mentioned problem, and therefore has a main object to provide an image forming apparatus capable of detecting a pattern image for detecting color misregistration by an optimal method depending on a change in surface state of a transfer member.

SUMMARY OF THE INVENTION

An image forming apparatus according to the present disclosure includes: an image forming unit configured to form images of different colors; a transfer member, to which the images formed by the image forming unit are to be transferred; a transfer unit configured to transfer the images from the transfer member onto a sheet; a sensor configured to detect reflected light from a detection image formed on the transfer member; and a controller configured to control the image forming unit to form detection images of the different colors, control the sensor to detect the reflected light from the detection images on the transfer member, detect a color misregistration of the detection images of the different colors based on a result of detecting the reflected light by the sensor, and control relative positions of images of the different colors to be formed by the image forming unit based on the color misregistration, wherein the sensor includes a light emitting element configured to emit light for irradiating the detection image at a predetermined angle of incidence, a first light receiving element arranged at a position at which diffused reflected light from the detection image is received at a first angle of reflection, and a second light receiving element arranged at a position at which the diffused reflected light from the detection image is received at a second angle of reflection, wherein the first angle of reflection is smaller than the predetermined angle of incidence, wherein the second angle of reflection is smaller than the predetermined angle of incidence, wherein the second angle of reflection is smaller than the first angle of reflection, and wherein the controller is configured to select, based on information related to a state of the transfer member, a light receiving element for use in detecting the diffused reflected light from the detection images from among the first light receiving element and the second light receiving element.

Further features of the present invention will become apparent from the following description of exemplary embodiments (with reference to the attached drawings).

DESCRIPTION OF THE EMBODIMENTS

Now, at least one embodiment of the present disclosure is described in detail with reference to the drawings.

Overall Configuration

Figure 1:
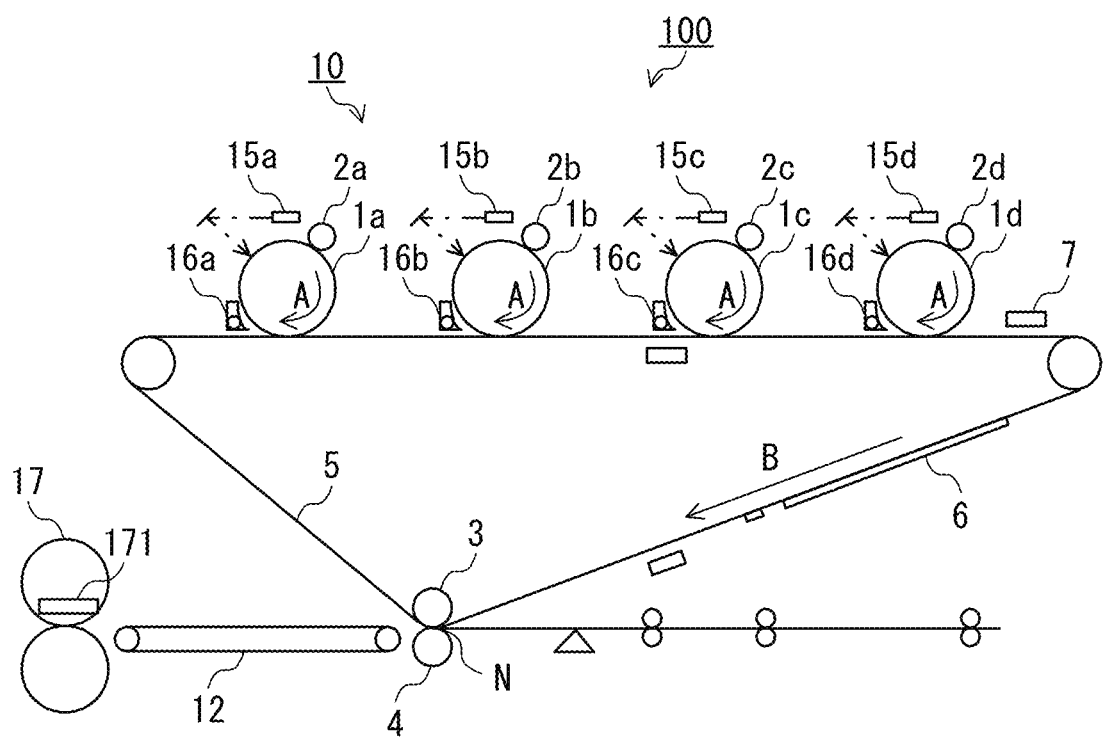
FIG. 1 is a schematic cross-sectional view of an image forming apparatus.

FIG. 1 is a schematic cross-sectional view of an image forming apparatus 100 according to at least one embodiment. The image forming apparatus 100 includes an image forming unit 10, an intermediate transfer belt 5, a belt support roller 3, a transfer roller 4, and a fixing device 17. The image forming unit 10 includes photosensitive drums 1a to 1d, charging devices 2a to 2d, exposure devices 15a to 15d, and developing devices 16a to 16d, and is configured to form yellow (Y), cyan (C), magenta (M), and black (K) toner images. The letter "a" suffixed to the reference signs represents a configuration for forming the yellow image. The letter "b" suffixed to the reference signs represents a configuration for forming the cyan image. The letter "c" suffixed to the reference signs represents a configuration for forming the magenta image. The letter "d" suffixed to the reference signs represents a configuration for forming the black image.

The photosensitive drums 1a, 1b, 1c, and 1d are each rotated in a direction of the arrow A. The photosensitive drums 1a, 1b, 1c, and 1d are photosensitive members each having a photosensitive layer on a surface thereof. The charging devices 2a, 2b, 2c, and 2d are configured to uniformly charge the surfaces of the photosensitive drums 1a, 1b, 1c, and 1d, respectively. The exposure devices 15a, 15b, 15c, and 15d are configured to expose the surfaces of the photosensitive drums 1a, 1b, 1c, and 1d charged by the charging devices 2a, 2b, 2c, and 2d, respectively, to light with laser light. The photosensitive drums 1a, 1b, 1c, and 1d are scanned with laser light emitted from the exposure devices 15a, 15b, 15c, and 15d so that electrostatic latent images are formed on the surfaces of the photosensitive drums 1a, 1b, 1c, and 1d, respectively. The developing devices 16a, 16b, 16c, and 16d are configured to develop the electrostatic latent images with toner (developer) to form the toner images of respective colors on the photosensitive drums 1a, 1b, 1c, and 1d, respectively.

The intermediate transfer belt 5 is stretched around a plurality of rollers including a drive roller and the belt support roller 3. To the intermediate transfer belt 5, the toner images formed by the image forming unit 10 are transferred. The intermediate transfer belt 5 serves as an image bearing member configured to bear and convey the toner images. Moreover, the intermediate transfer belt 5 also serves as a transfer member, to which the toner images are to be transferred. The drive roller of the intermediate transfer belt 5 is rotated so that the intermediate transfer belt 5 rotates in a direction of the arrow B. The toner images of respective colors formed on the photosensitive drums 1a, 1b, 1c, and 1d are sequentially transferred onto the intermediate transfer belt 5 in an overlapping manner. As a result, a full-color toner image 6 is formed on the intermediate transfer belt 5.

The transfer roller 4 is arranged on a side opposite to the belt support roller 3 with respect to the intermediate transfer belt 5. A nip portion N formed by the transfer roller 4 pressing the intermediate transfer belt 5 is called a "transfer portion" or "transfer unit". The intermediate transfer belt 5 is rotated to convey the toner image 6 to the nip portion N. The sheet is conveyed to the nip portion N by conveyance rollers. The transfer roller 4 transfers, when the sheet passes through the nip portion N, the toner image 6 on the intermediate transfer belt 5 onto the sheet. The sheet having the toner image 6 transferred thereto is conveyed to the fixing device 17 by a conveyance belt 12. The fixing device 17 includes a heater 171. The fixing device 17 is configured to heat the toner image that has been transferred to the sheet with the heater 171, and pressurizes the sheet with rollers to fix the toner image on the sheet. Thereafter, the sheet is delivered to a tray (not shown) of the image forming apparatus 100. In this manner, image forming processing by the image forming apparatus 100 is ended.

On a downstream side of the photosensitive drum 1d in a conveyance direction (direction B) of the intermediate transfer belt 5, an optical sensor 7 is arranged. The optical sensor 7 is configured to detect a detection image formed on the intermediate transfer belt 5 to set an image forming condition. The detection image is, for example, a pattern image for detecting color misregistration and a test image for detecting an image density. A result of detecting the pattern images is used to detect a color misregistration amount, which is used for color misregistration correction. A result of detecting the test image is used to determine a correction amount to be used for image density correction.

The toner images of respective colors, which are transferred from the photosensitive drums 1a to 1d onto the intermediate transfer belt 5, may be shifted in transfer position on the intermediate transfer belt 5. It is known that this is caused by an increase in temperature of the exposure devices 15a to 15d. The shift in a transfer position changes a hue and a color tone of the full-color image. To address this problem, the image forming apparatus 100 reads the pattern image with the optical sensor 7, and controls exposure timings of the exposure devices 15a to 15c or other image forming conditions based on the detected color misregistration amount to correct image forming positions.

Moreover, the image forming apparatus 100 may vary in density of the image to be formed due to a usage environment (temperature and humidity) and an increase in the number of prints. To address this problem, the image forming apparatus 100 is configured to detect the test image by the optical sensor 7, and perform image density correction, in which an image forming condition is controlled based on a result of detecting the test image. In this case, the image forming condition includes intensities of laser light to be emitted by the exposure devices 15a to 15d, developing biases to be applied to the developing devices 16a to 16d, charging biases to be applied to the charging devices 2a to 2d, and transfer biases to be applied to the transfer roller 4, for example. In order to correct the image density, the image forming apparatus 100 may control a plurality of image forming conditions, or control only a particular image forming condition.

Optical Sensor

Figure 2:
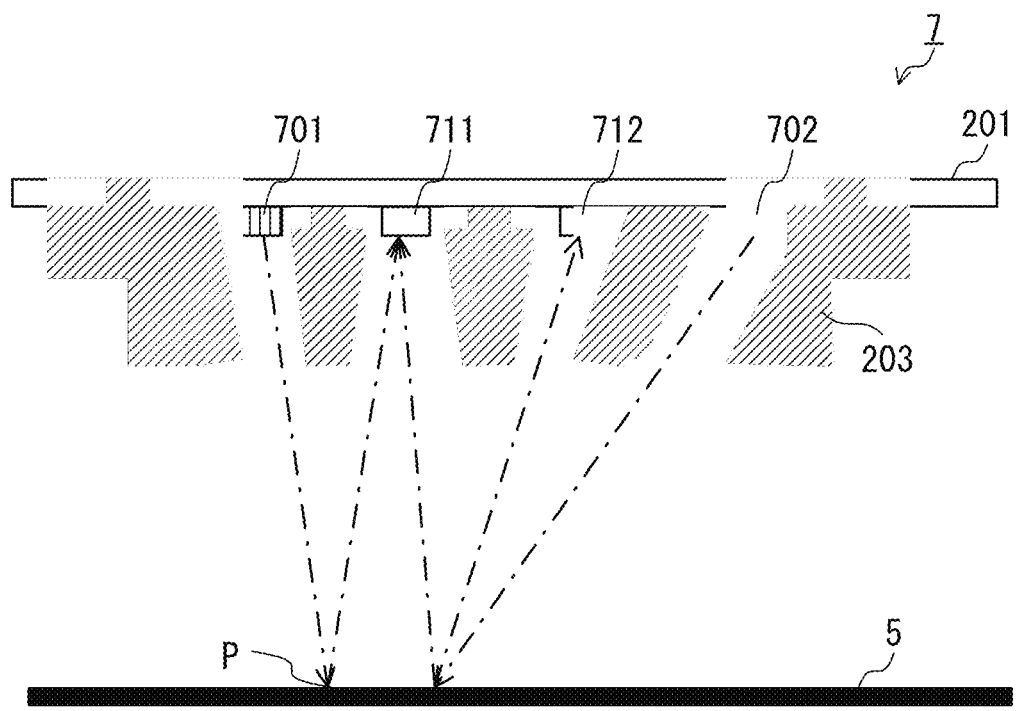
FIG. 2 is a schematic view of a main part of an optical sensor.

FIG. 2 is an explanatory diagram of the optical sensor 7. The optical sensor 7 includes two light emitting elements and two light receiving elements. The optical sensor 7 in at least one embodiment includes two light emitting diodes (LEDs) (first LED 701 and second LED 702) as the light emitting elements. The optical sensor 7 includes two photodiodes (PDs) (first PD 711 and second PD 712) as the light receiving elements. The first LED 701, the second LED 702, the first PD 711, and the second PD 712 are arranged side by side in a predetermined direction on a predetermined surface (mounting surface) of the same substrate 201, and bonded thereto by die bonding and wire bonding.

The substrate 201 is a printed circuit board (PCB), for example, but the present disclosure is not limited thereto. The first LED 701, the second LED 702, the first PD 711, and the second PD 712 are electrically connected to a power supply circuit (not shown) and a detection circuit (not shown), for example, via the substrate 201.

The first LED 701 is configured to emit light to an object to be measured (surface of intermediate transfer belt 5 or detection image on the intermediate transfer belt 5). The first PD 711 is arranged at a position at which, when the first LED 701 emits light, specularly reflected light from the object to be measured can be received. A point P of FIG. 2 indicates a position at which the light emitted from the first LED 701 to the intermediate transfer belt 5 is reflected. In other words, the first LED 701 and the first PD 711 are arranged such that the light emitted from the first LED 701 is specularly reflected (so that an angle of incidence and an angle of reflection are equal to each other) at the point P, and the reflected light is received by the first PD 711.

The second LED 702 is arranged at a position at which specularly reflected light of light emitted to the object to be measured is not received by the first PD 711 or the second PD 712. In other words, the second LED 702 is arranged such that, even when the light emitted from the second LED 702 is specularly reflected by the intermediate transfer belt 5, the reflected light is not received by the first PD 711 or the second PD 712. Even when the light emitted from the second LED 702 is specularly reflected by the detection image, the specularly reflected light from the detection image is not received by the first PD 711 or the second PD 712. The second LED 702 is arranged at a position at which diffused reflected light of the light emitted to the object to be measured is received by the first PD 711 and the second PD 712. The first LED 701 and the second LED 702 are arranged to irradiate different positions on the intermediate transfer belt 5.

The first PD 711 is arranged at a position at which the specularly reflected light of light emitted from the first LED 701 to the object to be measured, and diffused reflected light of light emitted from the second LED 702 to the object to be measured can be received. The second PD 712 is arranged at a position at which diffused reflected light of light emitted from the second LED 702 to the object to be measured can be received and which is different from a position of the first PD 711. The second PD 712 is not arranged at the position at which the specularly reflected light of the light emitted from the first LED 701 to the object to be measured is received. The first PD 711 and the second PD 712 are not arranged at positions at which the specularly reflected light of the light irradiated from the second LED 702 to the object to be measured is received.

The substrate 201 is mounted to a housing 203. The housing 203 has light guide paths for guiding irradiation light so that light emitted from the first LED 701 and the second LED 702 efficiently irradiate the object to be measured. The housing 203 also has light guide paths for guiding the reflected light so that the first PD 711 and the second PD 712 efficiently receive the reflected light from the object to be measured.

In other words, the light emitted from the first LED 701 travels in the direction of the optical axis (one-dot broken line in FIG. 2), and irradiates the object to be measured, with the light guide path formed in the housing 203. The specularly reflected light from the object to be measured travels in the direction of the optical axis (one-dot broken line in FIG. 2), and reaches the first PD 711, with the light guide path formed in the housing 203. The light emitted from the second LED 702 travels in the direction of the optical axis (one-dot broken line in FIG. 2), and irradiates the object to be measured, with the light guide path formed in the housing 203.

When the second LED 702 emits light, the first PD 711 receives the diffused reflected light from the object to be measured through the light guide path formed in the housing 203. When the second LED 702 emits light, the second PD 712 receives diffused reflected light from the object to be measured through the light guide path formed in the housing 203. When the first LED 701 emits light, the first PD 711 receives specularly reflected light from the object to be measured through the light guide path formed in the housing 203.

In a case where the image forming apparatus 100 detects the color misregistration based on a result of receiving the specularly reflected light, the image forming apparatus 100 causes the first LED 701 to emit light, to thereby cause the first PD 711 to receive specularly reflected light from the pattern images formed on the intermediate transfer belt 5. This is called "specular reflection color misregistration detection". In a case where the image forming apparatus 100 detects the image density based on a result of receiving the specularly reflected light, the image forming apparatus 100 causes the first LED 701 to emit light, to thereby cause the first PD 711 to receive specularly reflected light from the test image formed on the intermediate transfer belt 5. This is called "specular reflection density detection".

In a case where the image forming apparatus 100 detects the color misregistration based on a result of receiving the diffused reflected light, the image forming apparatus 100 causes the second LED 702 to emit light, to thereby cause the first PD 711 to receive diffused reflected light from the pattern images formed on the intermediate transfer belt 5. This is called "diffused reflection color misregistration detection". In a case where the image forming apparatus 100 detects the image density based on a result of receiving the diffused reflected light, the image forming apparatus 100 causes the second LED 702 to emit light, to thereby cause the second PD 712 to receive diffused reflected light from the test image formed on the intermediate transfer belt 5. This is called "diffused reflection density detection".

The first LED 701, the second LED 702, the first PD 711, and the second PD 712 are mounted on the same substrate 201, and hence the elements can be mounted substantially in parallel to the intermediate transfer belt 5. Therefore, the shift of the optical axis from the optical-axis center point P can be reduced as compared to the case of forming the elements by bullet type elements with lead pins, for example. Further, the first LED 701, the second LED 702, the first PD 711, and the second PD 712 are elements bonded to the substrate 201 by die bonding and wire bonding, and hence can be reduced in element interval. Therefore, the entire size of the optical sensor 7 can be reduced. For example, while dimensions of a general element (chip) manufactured by crystal growth are about 3 mm×2 mm×1 mm, dimensions of a bullet type element are about 5 mm×10 mm×5 mm even without the lead pins. Therefore, the optical sensor 7 in which the elements are bonded to the substrate by die bonding and wire bonding can significantly reduce a part volume, and can downsize the optical sensor 7 itself.

Figure 3A:
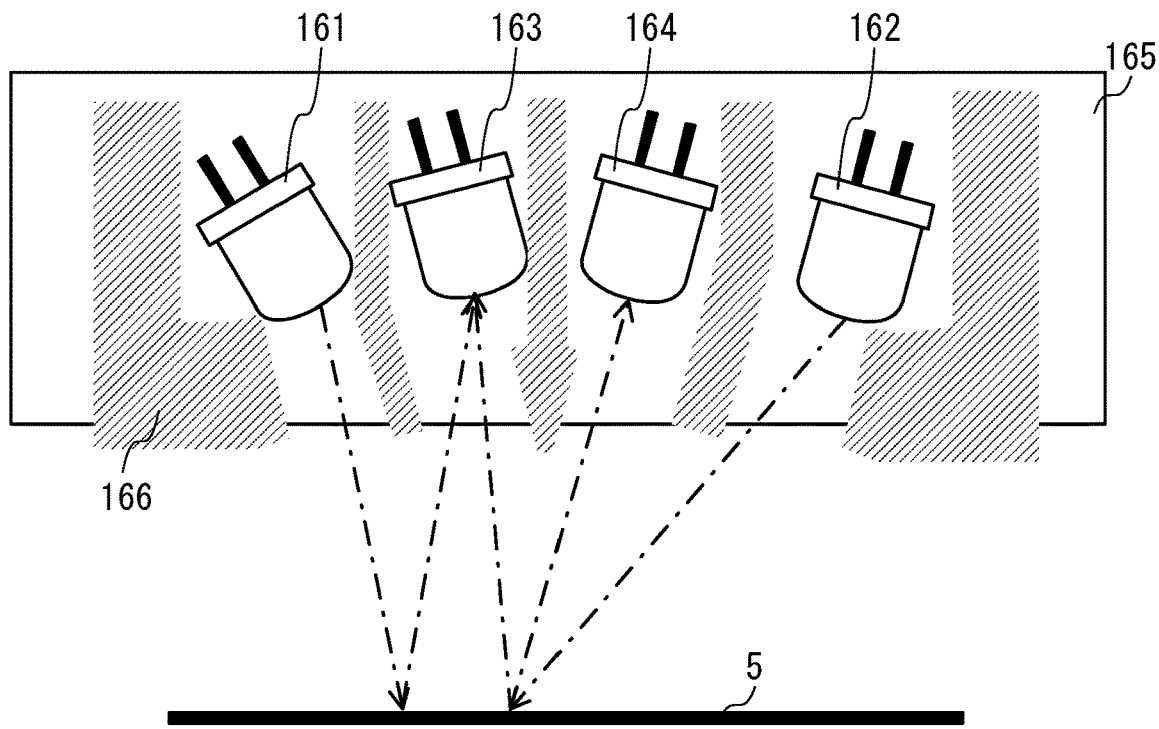
FIG. 3A and FIG. 3B are schematic views of a main part of an optical sensor including bullet type elements.
Figure 3B:
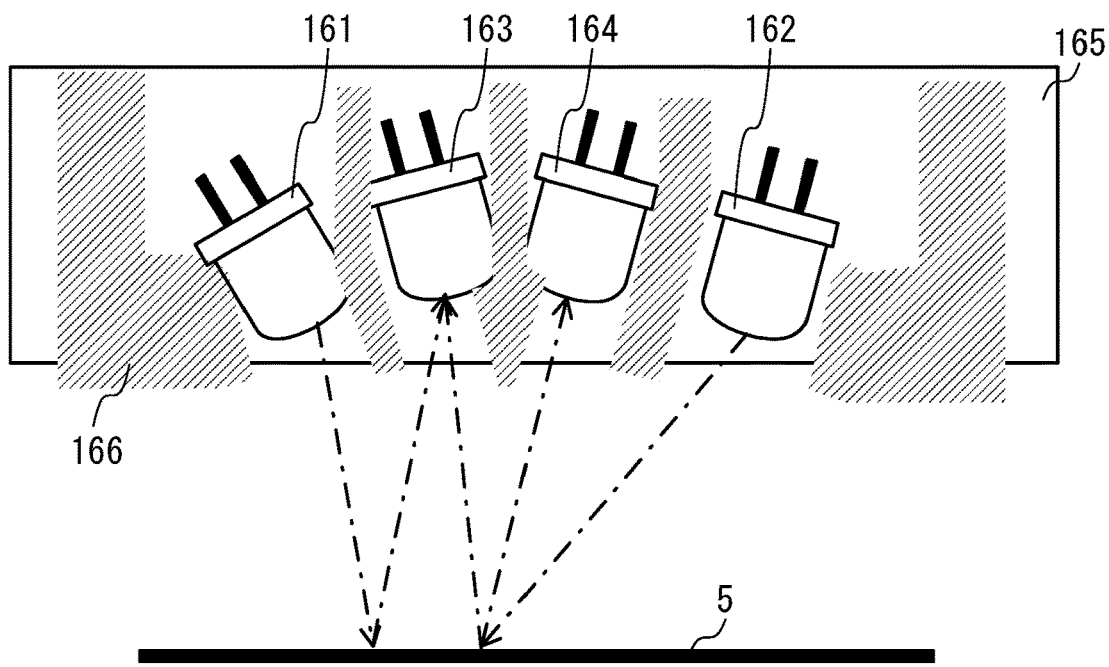

Now, as a comparative example, an optical sensor including bullet type elements is described. FIG. 3A and FIG. 3B are explanatory diagrams of the optical sensor including the bullet type elements. In a case where a positional relationship between light emitting elements 161 and 162 and light receiving elements 163 and 164 is achieved by a relationship (irradiation angle, receiving angle) similar to that of FIG. 2, it is required to bring the light emitting element 161 and the light receiving element 163 closer to each other. An example of the above-mentioned configuration is illustrated in FIG. 3B. In a case where the light emitting element 161 and the light receiving element 163 have the positional relationship similar to that of FIG. 2 with respect to the intermediate transfer belt 5, the light emitting element 161 and the light receiving element 163 are brought too close to each other. As a result, a function as a light-shielding wall of the housing 166 provided on a substrate 165 is inhibited. Therefore, in order to prevent the light emitting elements 161 and 162 and the light receiving elements 163 and 164 from interfering with the light-shielding wall, it is required to increase the interval between the elements as in FIG. 3A, but in this case, the optical sensor is increased in size.

As described above, in the optical sensor 7 in at least one embodiment, the light emitting elements 161 and 162, and the light receiving elements 163 and 164 are bonded to the substrate by die bonding and wire bonding. With the first LED 701, the second LED 702, the first PD 711, and the second PD 712 being bonded to the substrate 201 by die bonding and wire bonding, the distance between the elements can be reduced. As a result, the optical sensor 7 can be downsized as compared to the optical sensor including the bullet type elements (FIG. 3A and FIG. 3B). Further, the optical sensor 7 can reduce the distance between the first LED 701 and the first PD 711, and hence design flexibility is also increased. Therefore, according to the optical sensor 7, the first LED 701, the second LED 702, the first PD 711, and the second PD 712 can be arranged in a positional relationship that is suitable for detecting the specularly reflected light and the diffused reflected light from the object to be measured. In particular, in the optical sensor 7 in which the light emitting elements are shared or the light receiving elements are shared, the specularly reflected light and the diffused reflected light from the detection image can be detected more accurately than in the related-art optical sensor including the bullet type elements.

Controller

Figure 4:
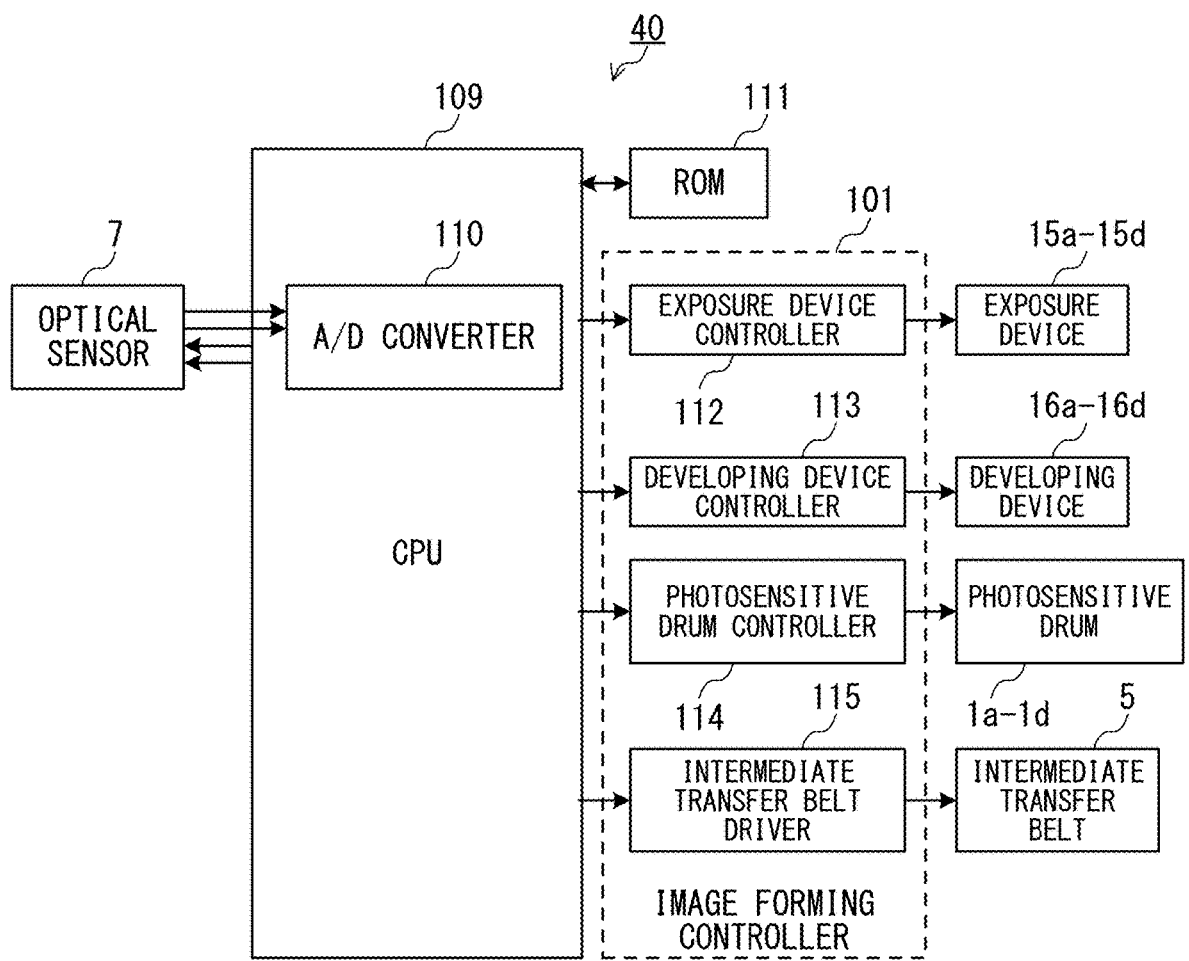
FIG. 4 is a control block diagram of the image forming apparatus.

Now, returning to the description of the image forming apparatus 100 of at least one embodiment. FIG. 4 is an exemplary diagram of an example of a configuration of a controller configured to control the image forming apparatus 100. A controller 40 includes a central processing unit (CPU) 109, a read-only memory (ROM) 111, and an image forming controller 101. The CPU 109 includes an A/D converter 110. The CPU 109 is configured to control an operation of the image forming apparatus 100 by executing a computer program stored in the ROM 111. The ROM 111 has stored therein, in addition to the computer program, pattern image data to be used to form the pattern images for the color misregistration detection, which are to be described later, and test image data to be used for forming the test image for the image density detection.

The image forming controller 101 includes an exposure device controller 112, a developing device controller 113, a photosensitive drum controller 114, and an intermediate transfer belt driver 115. The exposure device controller 112 is configured to control intensities and emission timings of laser light emitted from the exposure devices 15a to 15d. The developing device controller 113 is configured to control motors for rotating developing rollers included in the developing devices 16a to 16d. The photosensitive drum controller 114 is configured to control motors for rotating the photosensitive drums 1a to 1d. The intermediate transfer belt driver 115 is configured to control a motor for rotating the intermediate transfer belt 5.

The controller 40 may be implemented not only by executing the computer program, but also by a discrete part or a one-chip semiconductor product. The one-chip semiconductor product includes a micro-processing unit (MPU), an application specific integrated circuit (ASIC), or a system-on-a-chip (SOC), for example.

The CPU 109 is configured to control the optical sensor 7 to cause the first LED 701 and the second LED 702 to independently emit light (be lit). The optical sensor 7 is configured to receive reflected light from the object to be measured by the first PD 711 and the second PD 712. The first PD 711 and the second PD 712 are configured to output, as a detection result, an analog signal generated by converting the received reflected light into a voltage. The CPU 109 is configured to acquire analog signals output from the first PD 711 and the second PD 712 through the A/D converter 110. The CPU 109 is configured to store, in a memory (not shown), digital signals into which the analog signals are converted by the A/D converter 110.

The CPU 109 is configured to control the exposure devices 15*a* to 15*d*, the developing devices 16*a* to 16*d*, and the photosensitive drums 1*a* to 1*d* by the image forming controller 101 to form the detection image on the intermediate transfer belt 5. The CPU 109 is configured to cause the first LED 701 and the second LED 702 of the optical sensor 7 to be lit. The first LED 701 and the second LED 702 are configured to irradiate the object to be measured (the surface of the intermediate transfer belt 5 and the detection image formed on the intermediate transfer belt 5) with light. The first PD 711 and the second PD 712 are configured to receive reflected light from the object to be measured to output an analog signal corresponding to the reflected light. The CPU 109 is configured to detect the color misregistration amount and the image density in accordance with the analog signals output from the first PD 711 and the second PD 712 to perform the color misregistration correction and the image density correction.

Pattern Images for Color Misregistration Detection

Figure 5:
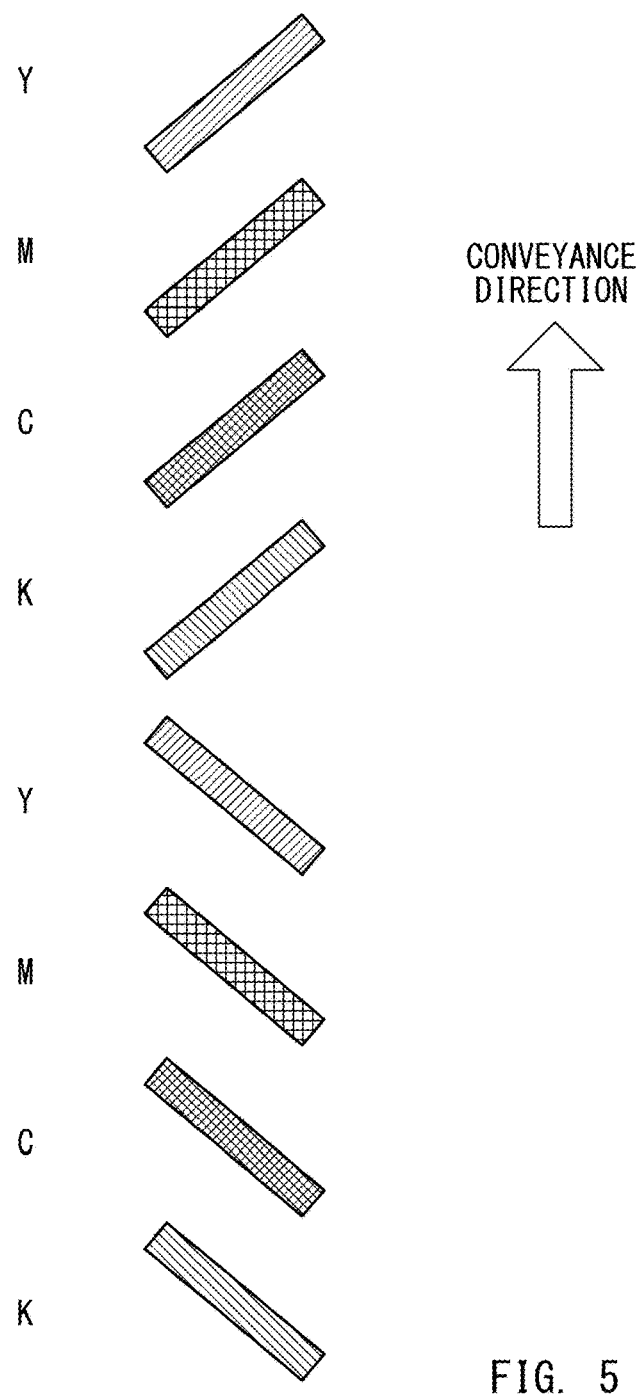
FIG. 5 is an explanatory diagram of first pattern images.

FIG. 5 is an explanatory diagram of first pattern images for the color misregistration detection. The first pattern images include color patterns of yellow, which is a reference color, and color patterns of other colors (magenta, cyan, and black). The color patters are images formed to be inclined at a predetermined angle (for example, 45°) with respect to the conveyance direction of the intermediate transfer belt 5. Two color patterns of the same colors are formed. The color patterns of the same colors are formed to be inclined in different directions with respect to the conveyance direction of the intermediate transfer belt 5.

The first pattern images are used in the case where the first PD 711 receives the specularly reflected light of the light emitted from the first LED 701. For example, in a case where an amount of the reflected light from the intermediate transfer belt 5 is a predetermined amount or more, the color misregistration amount is detected with the use of the first pattern images. In a case where a gloss of the front surface of the intermediate transfer belt 5 is not reduced, an amount of the specularly reflected light from the front surface of the intermediate transfer belt 5 becomes larger than an amount of specularly reflected light from the first pattern images. Therefore, an analog signal value corresponding to a result of receiving the reflected light from a region (front surface of the intermediate transfer belt 5) in which the first pattern images are not formed becomes higher than an analog signal value corresponding to a result of receiving the reflected light from the first pattern images.

Figure 6:
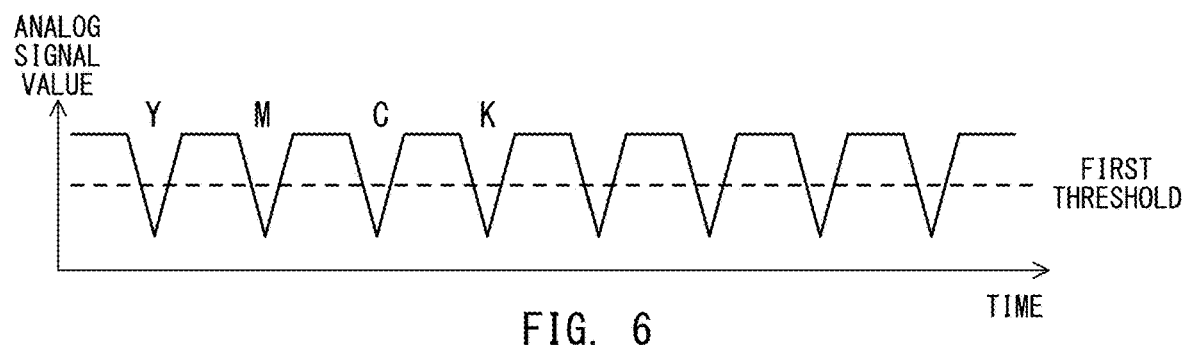
FIG. 6 is a graph for showing an example of an analog signal corresponding to results of detecting the first pattern images.

FIG. 6 is a graph for showing an example of an analog signal in a case where reflected light from the first pattern images is detected by the first LED 701 and the first PD 711. An analog signal value of the first PD 711 obtained in a case where reflected light from a color pattern is received is lower than an analog signal value of the first PD 711 obtained in a case where the reflected light from the front surface of the intermediate transfer belt 5 is received.

The CPU 109 is configured to convert the analog signal into a binary signal indicating a first level or a second level based on a first threshold value. The converted signal corresponds to a result of comparison between the analog signal value (FIG. 6) and the first threshold value. At this time, the CPU 109 determines the first threshold value based on an analog signal value obtained in a case where the specularly reflected light from the front surface of the intermediate transfer belt 5 of the light emitted from the first LED 701 is received by the first PD 711. The CPU 109 detects a color misregistration amount of the color pattern of the first pattern images based on the binary signal described above. The color misregistration correction is a known technology, and a detailed description thereof is omitted here.

Figure 7A:
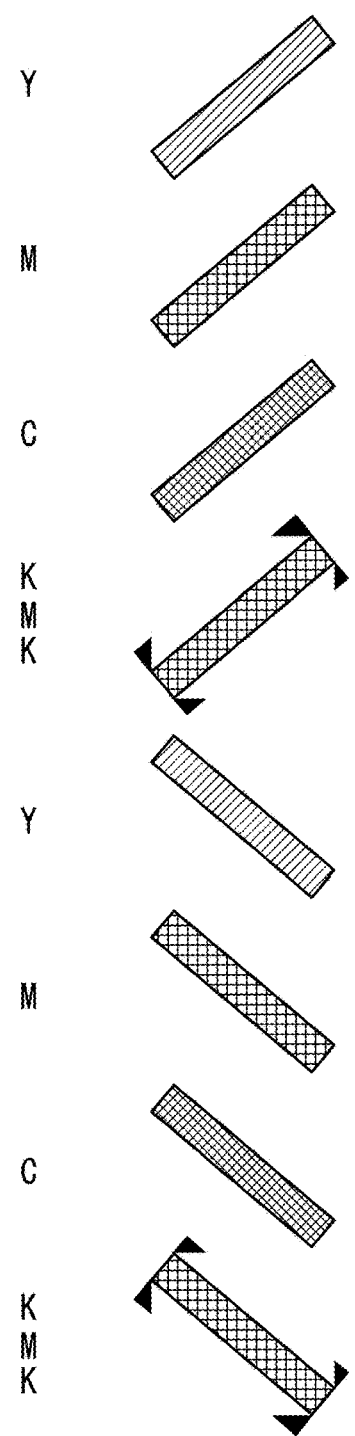
FIG. 7A and FIG. 7B are explanatory diagrams of second pattern images.
Figure 7B:
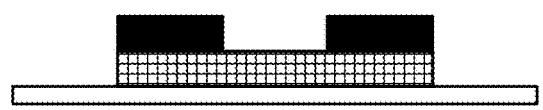

FIG. 7A and FIG. 7B are explanatory diagrams of second pattern images for the color misregistration detection. The second pattern images include color patterns of yellow, which is a reference color, and color patterns of other colors (magenta, cyan, and black). It should be noted, however, that the color patterns of black of the second pattern images are formed to be superimposed on the color patterns of magenta. The second pattern images are used in a case where diffused reflected light of the light emitted from the second LED 702 is received by the first PD 711. In other words, in a case where the amount of the reflected light from the intermediate transfer belt 5 is not the predetermined amount or more, a color misregistration amount is detected with the use of the second pattern images. In other words, in a case where the amount of reflected light from the intermediate transfer belt 5 is less than the predetermined amount, the color misregistration amount is detected with the use of the second pattern images.

Figure 8:
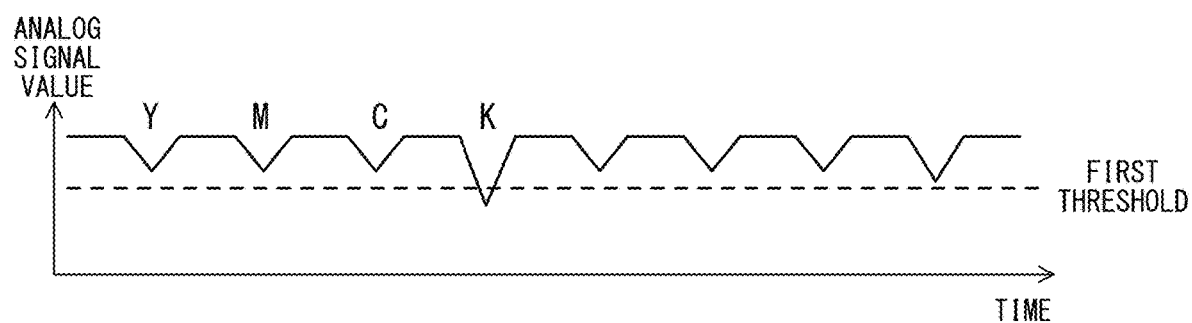
FIG. 8 is a graph for showing an example of an analog signal corresponding to results of detecting the first pattern images.

In a case where the gloss of the intermediate transfer belt 5 is reduced by wearing of the intermediate transfer belt 5, the amount of specularly reflected light from the front surface of the intermediate transfer belt 5 is reduced. FIG. 8 is a graph for showing an example of an analog signal obtained in a case where the reflected light from the first pattern images is detected by the first LED 701 and the first PD 711 in this case. In a case where the amount of specularly reflected light from the intermediate transfer belt 5 is reduced, as shown in FIG. 8, a difference between the analog signal value obtained in a case where specularly reflected light from the color patterns of respective colors is received and the analog signal value obtained in a case where the specularly reflected light from the intermediate transfer belt 5 is received is reduced. Therefore, there is a fear that the CPU 109 cannot detect the color misregistration from the binary signal with high accuracy.

Figure 9:
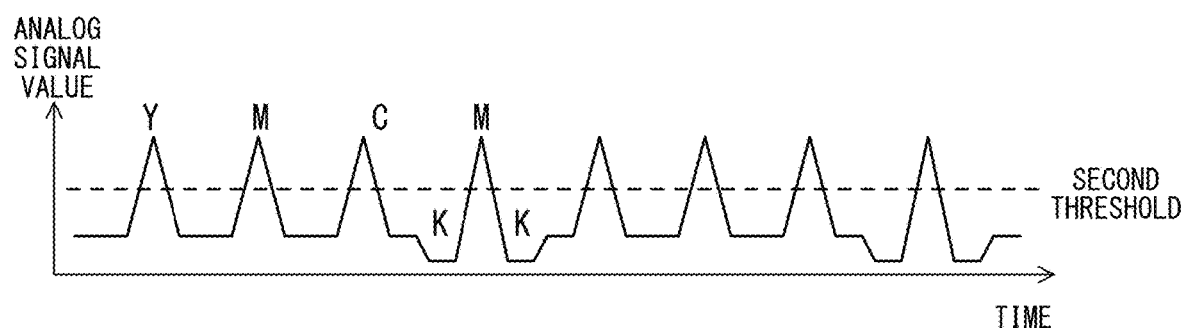
FIG. 9 is a graph for showing an example of an analog signal corresponding to results of detecting the second pattern images.

To address this problem, under a state in which the amount of specularly reflected light from the intermediate transfer belt 5 is reduced, the second pattern images are formed, and diffused reflected light from the second pattern images is detected by the optical sensor 7. The optical sensor 7 receives diffused reflected light of the light emitted from the second LED 702 by the first PD 711. FIG. 9 is a graph for showing an example of an analog signal obtained in a case where reflected light from the second pattern images is detected by the second LED 702 and the first PD 711.

As illustrated in FIG. 7A, the second pattern images are different from the first pattern images. Specifically, the color patterns of black are superimposed on the color patterns of magenta. In a case where the color patterns of black are detected with the use of diffused reflected light, the light emitted from the second LED 702 is absorbed by a black toner. Therefore, a difference between the amount of diffused reflected light from the color patterns of only black and the amount of diffused reflected light from the intermediate transfer belt 5 is extremely small. In each of the color patterns of black of the second pattern images, a pattern formed with the use of a magenta toner is exposed from a gap of patterns formed at an interval with the use of the black toner. This is called a "composite pattern". A cross-sectional view of the composite pattern is illustrated in FIG. 7B. Results of detecting the second pattern images including the composite patterns are shown in FIG. 9. An analog signal value corresponding to diffused reflected light from the composite pattern is a value corresponding to diffused reflected light from a region of the composite pattern formed with the use of the magenta toner. The interval between the patterns of the black toner is determined in advance, and hence the CPU 109 can determine a color misregistration amount of the color patterns of black based on a relative position between the region formed with the use of the magenta toner and the reference color patterns using a yellow toner.

The CPU 109 is configured to convert the analog signal (FIG. 9) into a binary signal indicating the first level or the second level based on a second threshold value. The converted signal corresponds to a result of comparison between the analog signal value (FIG. 9) and the second threshold value. At this time, the CPU 109 determines the second threshold value based on an analog signal value obtained in a case where the diffused reflected light from the front surface of the intermediate transfer belt 5 of the light emitted from the second LED 702 is received by the first PD 711. The CPU 109 detects a color misregistration amount of the color pattern of the second pattern images based on the binary signal described above. The color misregistration correction using a composite pattern is a known technology, and a detailed description thereof is omitted here.

In the image forming apparatus 100 according to at least one embodiment, the color misregistration amount of the image is detected with the use of the above-mentioned pattern images (first pattern images and second pattern images). The CPU 109 detects positions of the color patterns of respective colors to calculate relative positions of the pattern images of other colors with respect to the pattern images of the reference color (yellow). The CPU 109 determines the color misregistration amounts of respective colors based on differences between the calculated relative positions and a target relative position. The CPU 109 controls timings of writing by the exposure devices 15a to 15d based on the determined color misregistration amounts to perform the color misregistration correction. Moreover, the CPU 109 may correct image data based on the detected color misregistration amount so that the color misregistration of the image to be formed by the image forming unit 10 is suppressed, for example. The reference color is not limited to yellow, and may be magenta or cyan. Moreover, there may be adopted a configuration in which, in response to a user selecting a color misregistration detection mode via an operation panel (not shown), the CPU 109 selects the specular reflection color misregistration detection or the diffused reflection color misregistration detection.

Test Image for Image Density Detection

Figure 10A:
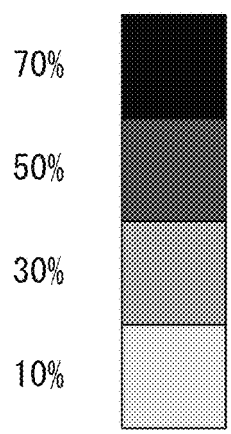
FIG. 10A and FIG. 10B are explanatory diagrams of test images for detecting an image density.
Figure 10B:
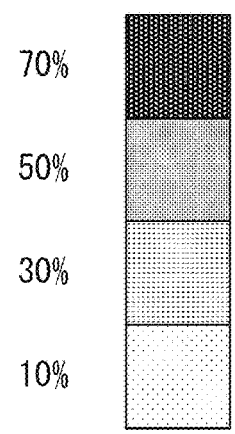

FIG. 10A and FIG. 10B are explanatory diagrams of test images for the image density detection. In FIG. 10A, an example of a first test image for the image density detection to be detected with the specularly reflected light is illustrated. In FIG. 10B, an example of a second test image for the image density detection to be detected with diffused reflected light is illustrated.

The first test image is used in a case where the specularly reflected light of the light emitted from the first LED 701 is received by the first PD 711. The first test image is used in detecting an image density of black, in particular. The black toner absorbs light, and hence an amount of diffused reflected light from a test image of black is extremely small. Therefore, in a case where a density of an image formed by the black toner is to be detected, the CPU 109 detects specularly reflected light from the test image of black. The first test image is formed of a gradation pattern of four image densities: 70%, 50%, 30%, and 10%. The image forming unit 10 forms the first test image based on an image signal value of the test image data. The image signal value of the test image data is determined in advance.

The first test image formed on the intermediate transfer belt 5 is read by the optical sensor 7. The analog signal output from the first PD 711 is converted to the digital signal by the A/D converter 110. The CPU 109 controls the image forming condition based on a difference between the digital signal value and a target value. For example, the CPU 109 controls an intensity of laser light emitted from the exposure device 15d by the image forming controller 101 to adjust the image density of black.

Figure 11:
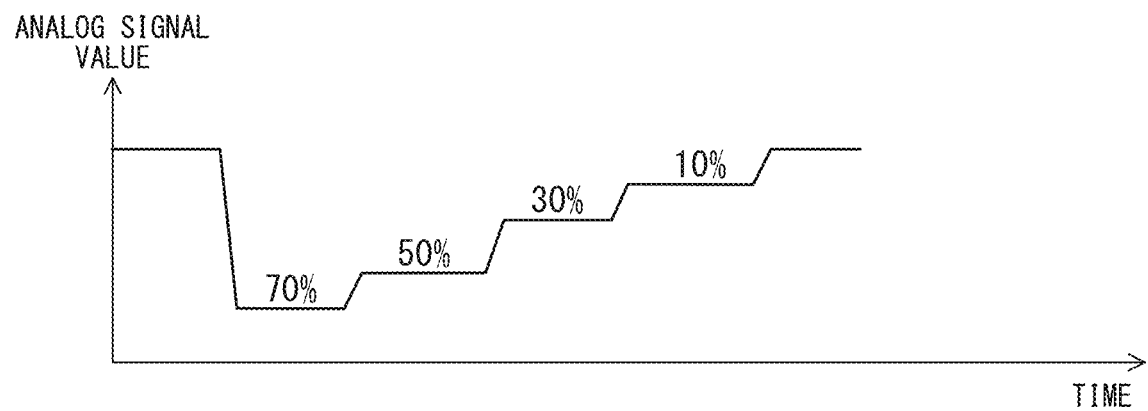
FIG. 11 is a graph for showing an example of an analog signal corresponding to a result of detecting a first test image.

FIG. 11 is a graph for showing an example of an analog signal obtained in a case where reflected light from the first test image is detected by the first LED 701 and the first PD 711. The image of the density of 70%, which is the highest density of the first test image, is reduced in amount of specularly reflected light because a toner adhesion amount is large in addition to the fact that the light is absorbed by the black toner. Therefore, the analog signal value output by the optical sensor 7 (first PD 711) is reduced. The image of the density of 10%, which is the lowest density of the first test image, is reduced in amount of light absorbed by the black toner as compared to the case of the density of 70%, and the toner adhesion amount is reduced, with the result that the amount of the specularly reflected light is increased. Therefore, the analog signal value output by the optical sensor 7 (first PD 711) is increased.

The second test image is used in a case where diffused reflected light of light emitted from the second LED 702 is received by the second PD 712. The second test image is used in detecting image densities of chromatic colors, such as yellow, magenta, and cyan, in particular. Image densities for yellow, magenta, and cyan are detected with the use of diffused reflected light. The second test image is formed of a gradation pattern of four densities: 70%, 50%, 30%, and 10%. In FIG. 10B, a test image of yellow is illustrated. In a case where the image densities are to be detected, the second test images of the colors: yellow, magenta, and cyan are formed on the intermediate transfer belt 5.

The second test image formed on the intermediate transfer belt 5 is read by the optical sensor 7. The analog signal output from the second PD 712 is converted to the digital signal by the A/D converter 110. The CPU 109 controls the image forming condition based on a difference between the digital signal value and a target value. In this manner, the CPU 109 adjusts the image densities of yellow, magenta, and cyan.

Figure 12:
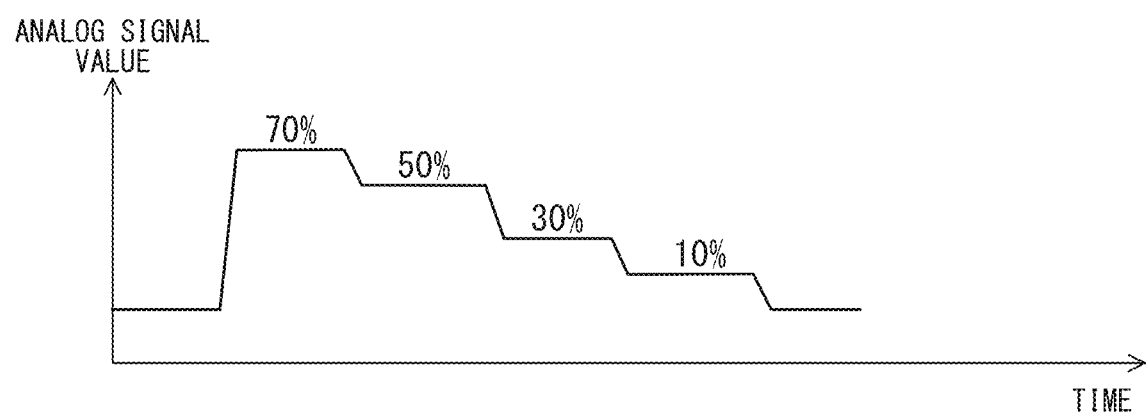
FIG. 12 is a graph for showing an example of an analog signal corresponding to a result of detecting a second test image.

FIG. 12 is a graph for showing an example of an analog signal obtained in a case where reflected light from the second test image is detected by the second LED 702 and the second PD 712. An analog signal of the second test image for yellow is illustrated here. The image of the density of 70%, which is the highest density of the second test image, is increased in amount of diffused reflected light because a toner adhesion amount is large in addition to the fact that the light is reflected by the yellow toner. Therefore, the analog signal value output by the optical sensor 7 (second PD 712)

is increased. The image of the density of 10%, which is the lowest density of the second test image, is reduced in amount of light reflected by the yellow toner as compared to the case of the density of 70%, and the amount of the diffused reflected light is reduced. Therefore, the analog signal value output by the optical sensor 7 (second PD 712) is reduced. Analog signals obtained with the second test images of magenta and cyan exhibit similar tendencies.

Detection Region of Optical Sensor

Figure 13:
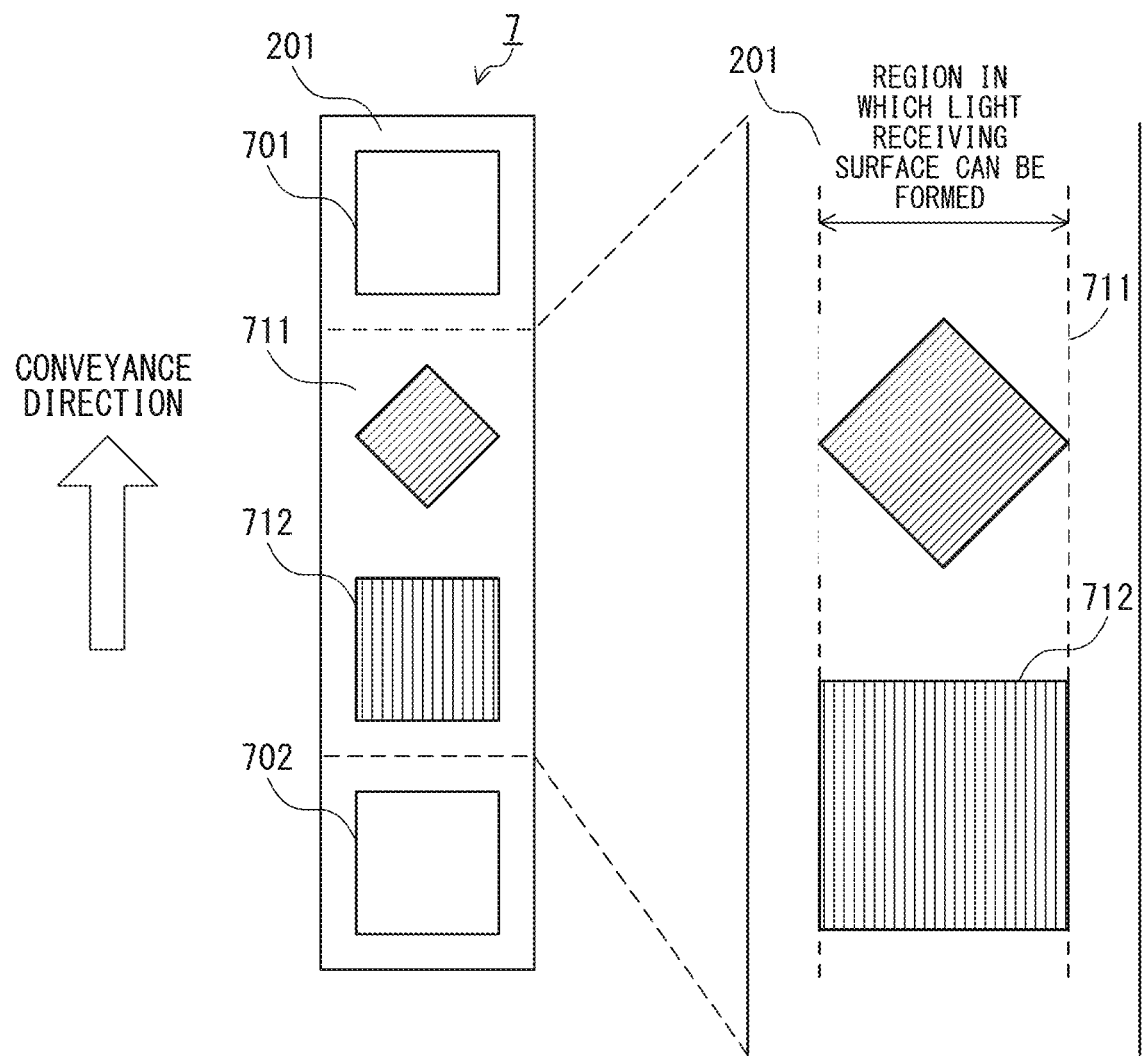
FIG. 13 is an explanatory diagram of a light receiving surface of the optical sensor.

FIG. 13 is an explanatory diagram of a light receiving surface of the optical sensor 7. FIG. 13 is a diagram of the optical sensor 7 as seen from the intermediate transfer belt 5 side, in which shapes of a light receiving surface of the first PD 711 and a light receiving surface of the second PD 712 on the substrate 201 are illustrated. The light receiving surface of the first PD 711 and the light receiving surface of the second PD 712 both have rectangular shapes, but have different sizes and are formed at different angles. In this example, the light receiving surface of the second PD 712 is formed to be larger than the light receiving surface of the first PD 711. Moreover, the light receiving surface of the first PD 711 and the light receiving surface of the second PD 712 are formed at angles that are different from each other by 5° or more. The light receiving surface has the same shape as that of a detection region. The formation angle is defined as, in a case where a longitudinal direction of the substrate 201 is assumed as a reference line, a smaller one of angles between the reference line and diagonals of the light receiving surface.

The light receiving surface of the first PD 711 is formed so that each side is inclined at a predetermined angle with respect to the conveyance direction of the intermediate transfer belt 5. The inclination angle of the light receiving surface of the first PD 711 with respect to the conveyance direction of the intermediate transfer belt 5 is the same as an angle (for example, 45°) at which each color pattern of the pattern images for detecting the color misregistration is inclined with respect to the conveyance direction of the intermediate transfer belt 5. A length of one side of the light receiving surface of the first PD 711 is equal to a width of the color pattern. A width of a diagonal of the light receiving surface of the first PD 711 is equal to the maximum width of a region of the optical sensor 7 in which the light receiving surface can be formed. With the light receiving surface of the first PD 711 being thus formed to be inclined, a rising edge and a falling edge of the analog signal output by the first PD 711 in a case where receiving reflected light from the pattern images can be made steep. Therefore, the color misregistration amount can be detected with high accuracy.

Figure 14A:
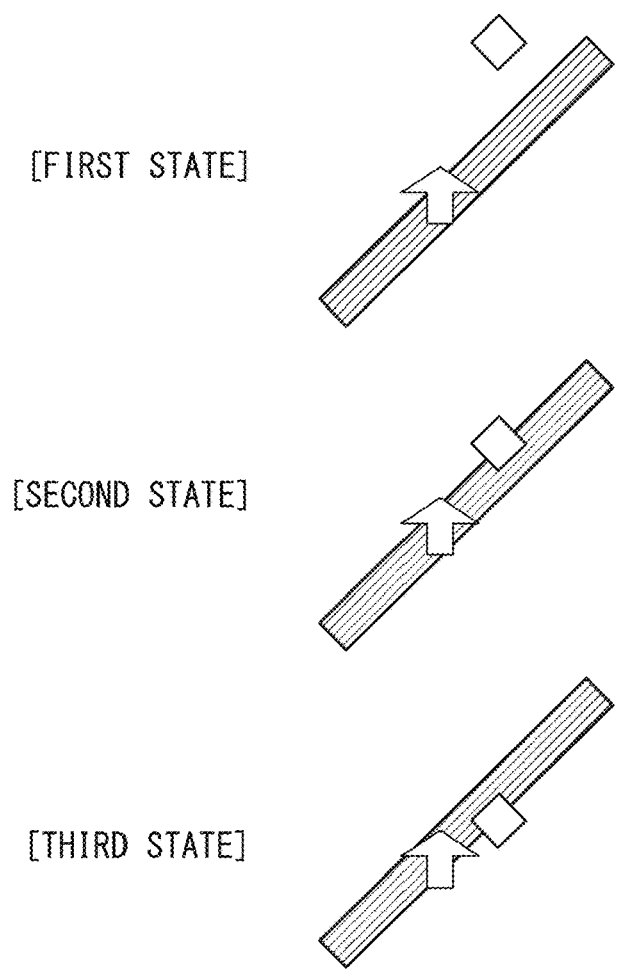
FIG. 14A shows explanatory diagrams of detection states of a first PD.
Figure 14B:
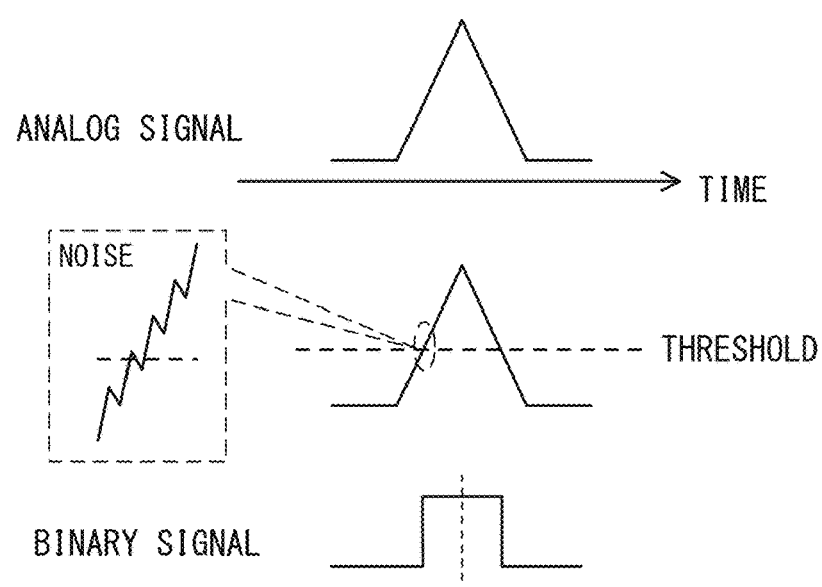
FIG. 14B shows explanatory graphs of an analog signal.

FIG. 14A and FIG. 14B are explanatory diagrams and explanatory graphs of detection states of the first PD 711 and an analog signal as a detection result. With reference to FIG. 14A and FIG. 14B, the case of detecting the pattern images for detecting the color misregistration is described. As illustrated in FIG. 14A, the detection region having the same shape as the light receiving surface of the first PD 711 is provided at the same inclination as the inclination of a pattern image with respect to the conveyance direction of the intermediate transfer belt 5. The pattern image is conveyed in the direction of the arrow by the intermediate transfer belt 5 to pass the detection region of the first PD 711. As a result, an analog signal output by the first PD 711 has the steepest rising edge and falling edge as illustrated in FIG. 14B. In FIG. 14B, an analog signal obtained in a case where a second pattern image is measured is illustrated.

In a case where a position of each color pattern of the pattern images is detected by a binary signal obtained by converting the analog signal based on a threshold value, in a case where the rising edge and the falling edge of the analog signal are steeper, the result is less affected by signal noise. In a case where signal noise occurs in the analog signal, for example, the edges of the binary signal are varied due to the noise to cause a fluctuation in position of the pattern image to be detected. The fluctuation amount becomes smaller in a case where the rising edge and the falling edge of the analog signal become steeper. Therefore, a detection error can be reduced. For this reason, it is desired to reduce an area of the light receiving surface of the first PD 711 for use in detecting the color misregistration.

The light receiving surface of the second PD 712 receives diffused reflected light of the second LED 702. A result of detection by the second PD 712 is used to detect the image density. In order to detect the image density accurately, it is desired for the second PD 712 to be able to detect a wider detection region evenly. In order to detect a test image of a low density, which reflects a low amount of light, it is preferred that the second PD 712 receive as much light as possible to secure an S/N. To this end, the light receiving surface of the second PD 712 is formed in a direction orthogonal to the conveyance direction of the intermediate transfer belt 5 to limits of a region in which the light receiving surface of the optical sensor 7 can be formed. With this configuration, the second PD 712 secures the maximum S/N without increasing the size of the optical sensor 7.

Change with Time of Front Surface of Intermediate Transfer Belt

Figure 15A:
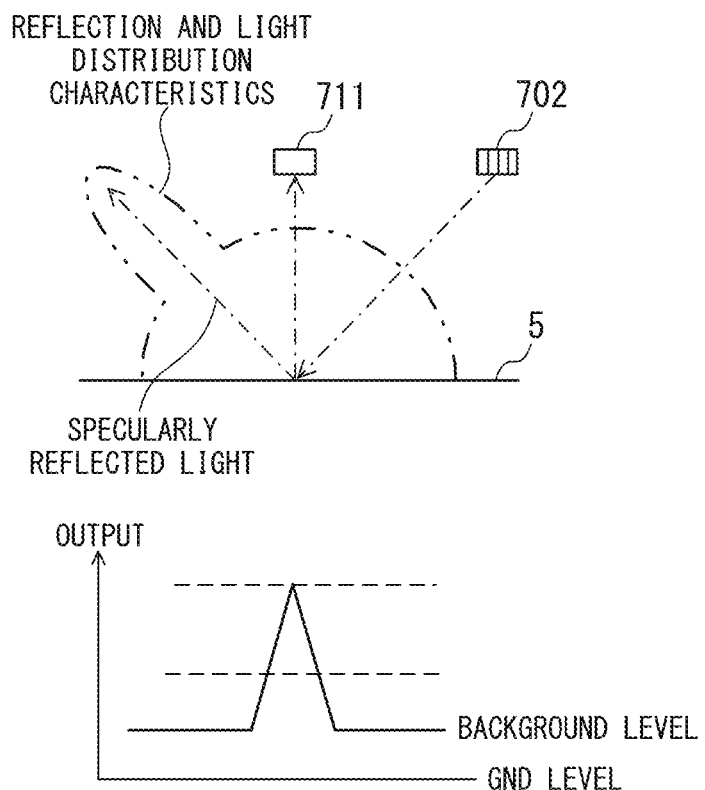
FIG. 15A and FIG. 15B are explanatory diagrams and graphs of a change in reflection characteristic.
Figure 15B:
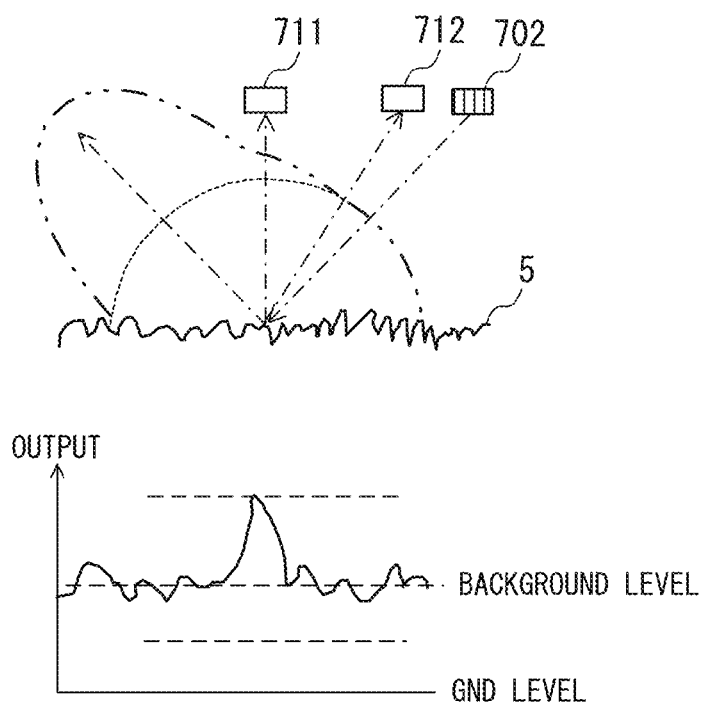

FIG. 15A and FIG. 15B are explanatory diagrams and graphs of a change in reflection characteristic due to a change with time of the intermediate transfer belt 5. In FIG. 15A, examples of reflection and light distribution characteristics and a detection waveform indicating a result of detecting the pattern image for detecting the color misregistration before the front surface of the intermediate transfer belt 5 changes with time are illustrated and shown. In FIG. 15B, examples of reflection and light distribution characteristics and a detection waveform of the pattern image for detecting the color misregistration after the front surface of the intermediate transfer belt 5 changes with time are illustrated and shown.

The reflection and light distribution characteristics before the change with time have a strong distribution of specularly reflected light from the second LED 702 to a direction of a specular reflection angle of the front surface of the intermediate transfer belt 5, and have a circular light distribution therearound. In the reflection and light distribution characteristics after the change with time, because the front surface of the intermediate transfer belt 5 is roughened to become uneven, a proportion occupied by a light distribution of diffused reflection becomes larger with respect to the specularly reflected light. Then, the first PD 711 receives reflected light in which the specularly reflected light is mixed in diffused reflected light from the second LED 702. The second PD 712 is less affected than the first PD 711 by the specularly reflected light caused by the change of the front surface of the intermediate transfer belt 5.

With the above-mentioned change in reflection and light distribution characteristics, a detection waveform output from the first PD 711 is changed from an isosceles triangle (FIG. 15A) to a distorted shape (FIG. 15B). Because of increased diffused reflected light from the intermediate transfer belt 5 caused by the change in reflection and light distribution characteristics, a level (background level) of the detection result of the front surface (background) of the intermediate transfer belt 5 is increased. When the background level is increased, a difference between a level of the detection result of the pattern image and the background level becomes smaller. This is a condition that is disadvantageous in detecting the color misregistration.

Figure 16:
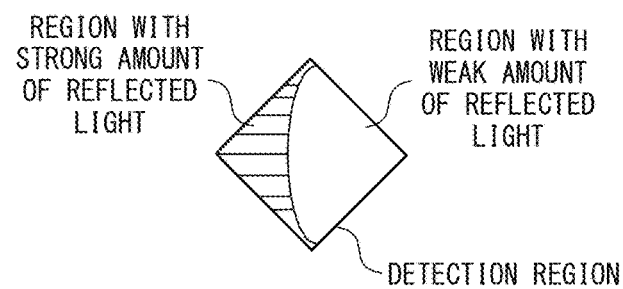
FIG. 16 shows an explanatory diagram and a graph of distortion of a detection waveform.

FIG. 16 is an explanatory diagram and a graph of distortion of a detection waveform. As described with reference to FIG. 14A, when the optical sensor 7 detects the pattern image for detecting the color misregistration, the position of the pattern image with respect to the detection region of the optical sensor 7 transitions in order of the first state, the second state, and the third state in accordance with the conveyance of the pattern image. The optical sensor 7 is configured to irradiate the detection region of the first PD 711 with light having a uniform intensity. The first PD 711 has a uniform light receiving sensitivity in the detection region. Before the change with time of the front surface of the intermediate transfer belt 5, a light emitting intensity and the light receiving sensitivity in the detection region of the first PD 711 are the same for the first state, the second state, and the third state. Therefore, rising and falling slopes of the detection waveform are the same so that the detection waveform is an isosceles triangle.

After the front surface of the intermediate transfer belt 5 changes with time and is changed in light distribution characteristic, even when the irradiating light is uniform, the proportion of the reflected light becomes uneven in the detection region of the first PD 711. As a result, asymmetry in sensitivity (amount of reflected light) is caused in the detection region as illustrated in FIG. 16. In a transition from the first state to the second state, the pattern image enters from the side with the lower sensitivity of the detection region, and hence the rising of the detection waveform is dull. In the transition from the second state to the third state, the pattern image exits while remaining on the side with the higher sensitivity of the detection region, and hence the detection waveform swells on the later time side.

Figure 17:
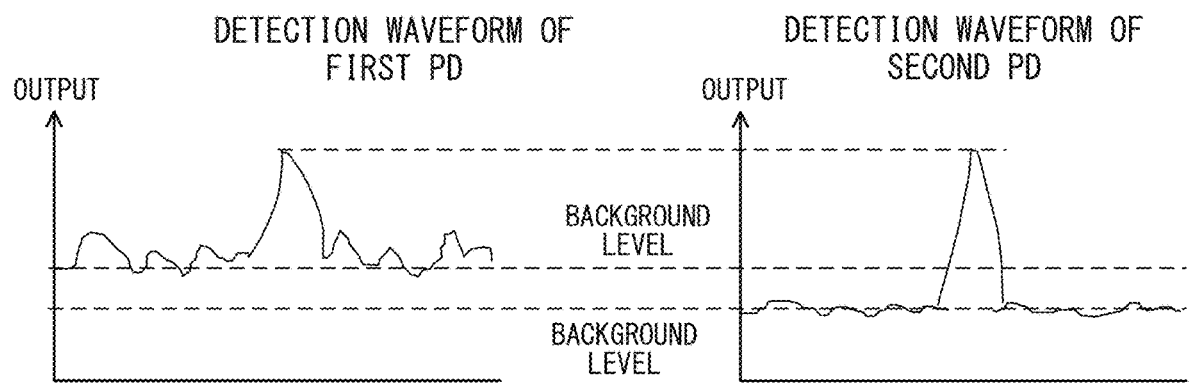
FIG. 17 shows graphs for showing examples of detection waveforms of the first PD and a second PD.

FIG. 17 shows graphs for showing examples of detection waveforms of the first PD 711 and the second PD 712, which have received the diffused reflected light from the intermediate transfer belt 5 of the light from the second LED 702, when the front surface has changed with time. As compared to the detection waveform of the first PD 711, the detection waveform of the second PD 712 has a lower background level, and a larger difference from the level of the detection waveform of the pattern image. Further, AC variations of the detection waveform caused by the change (uneven roughness) of the front surface of the intermediate transfer belt 5 are smaller for the detection waveform of the second PD 712 as compared to the detection waveform of the first PD 711. As a consequence, it can be seen that, when the front surface of the intermediate transfer belt 5 has changed with time, the detection result of the second PD 712 can detect the position of the pattern image for detecting the color misregistration more accurately than the first PD 711. In other words, when the front surface of the intermediate transfer belt 5 has changed with time, the position of the pattern image can be detected based on the detection result of the second PD 712 to reduce a detection error of the position of the pattern image.

Color Misregistration Correction

Figure 18:
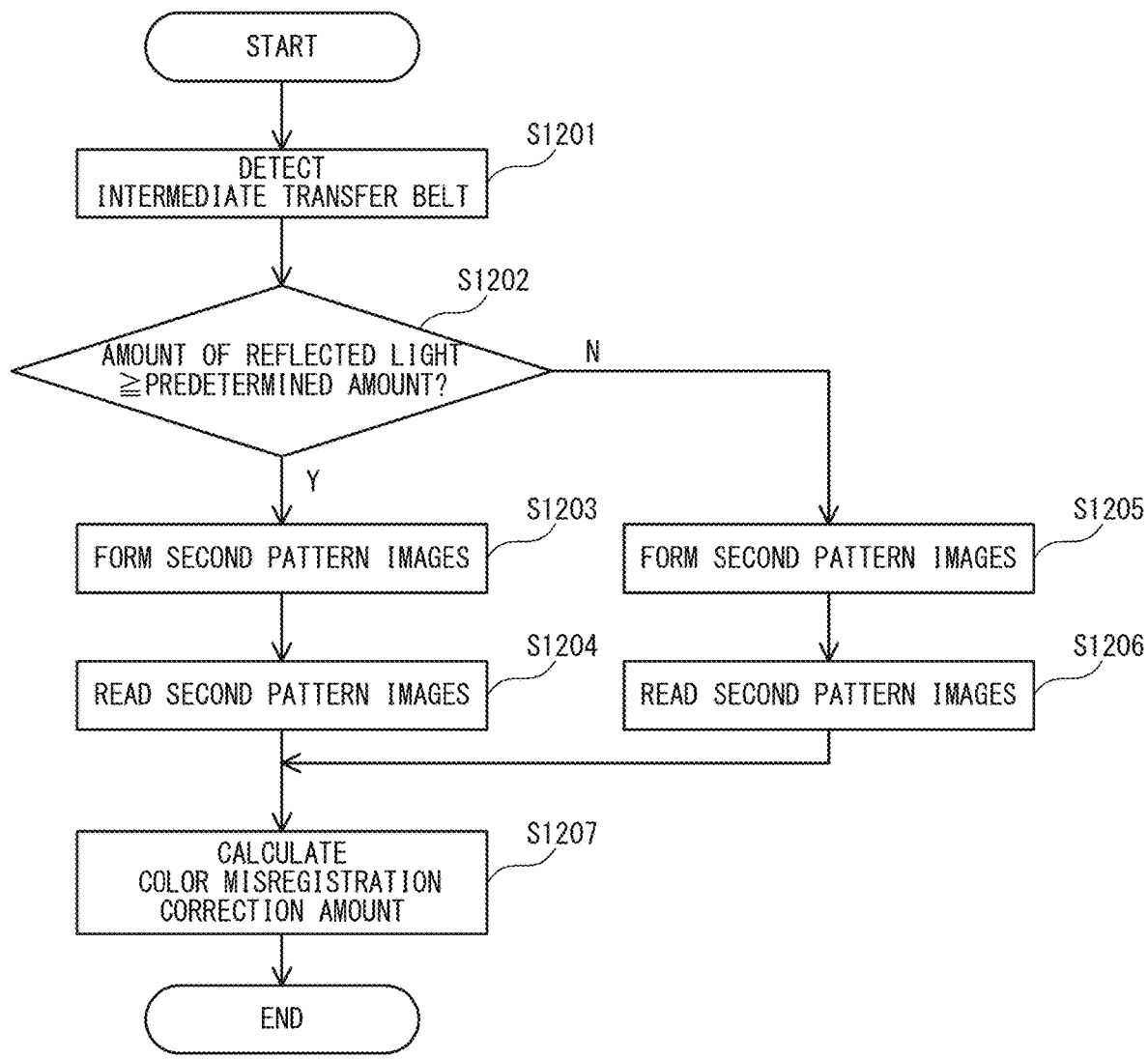
FIG. 18 is a flow chart for illustrating color misregistration detection processing.

FIG. 18 is a flow chart for illustrating processing of detecting the color misregistration amount in at least one embodiment. This processing is performed in a case where the detection of the color misregistration amount with the use of the first pattern images is difficult. For example, before the start of this processing, the CPU 109 has detected a reduction in gloss of the front surface of the intermediate transfer belt 5, and has determined not to detect the color misregistration amount with the use of the first pattern images by the specularly reflected light of the light from the first LED 701. For example, the CPU 109 causes the first LED 701 to emit light. An image is not formed on the intermediate transfer belt 5 at this time, and hence the light from the first LED 701 irradiates the front surface of the intermediate transfer belt 5. The first PD 711 is configured to receive the specularly reflected light from the front surface of the intermediate transfer belt 5 to output an analog signal corresponding to the amount of the specularly reflected light. The CPU 109 is configured to detect the amount of light reflected by the surface of the intermediate transfer belt 5 by acquiring the analog signal from the first PD 711. The CPU 109 is configured to determine the reduction in gloss of the front surface of the intermediate transfer belt 5 based on the analog signal value of the first PD 711 and a predetermined value. The predetermined value is set to 2.5 V, for example. In a case where the analog signal value of the first PD 711 is less than the above-mentioned predetermined value, the CPU 109 executes detection of the color misregistration amount with the use of the second pattern images. In a case where the analog signal value of the first PD 711 is the above-mentioned predetermined value or more, the CPU 109 executes detection of the color misregistration amount with the use of the first pattern images.

The CPU 109 may perform the determination of the reduction in gloss of the front surface of the intermediate transfer belt 5 based on the analog signal value of the first PD 711 obtained in a case where the second LED 702 is caused to emit light. Further, the CPU 109 may perform the determination of the reduction in gloss of the front surface of the intermediate transfer belt 5 based on the analog signal value of the second PD 712 obtained when the second LED 702 is caused to emit light. In those cases, the light from the second LED 702 irradiates the front surface of the intermediate transfer belt 5. The first PD 711 or the second PD 712 is configured to receive the diffused reflected light from the front surface of the intermediate transfer belt 5 to output an analog signal corresponding to the amount of the diffused reflected light. The CPU 109 is configured to detect the amount of light reflected by the surface of the intermediate transfer belt 5 by acquiring the analog signal from the first PD 711 or the second PD 712. The CPU 109 is configured to determine the reduction in gloss of the front surface of the intermediate transfer belt 5 based on the analog signal value of the first PD 711 or the second PD 712 and a predetermined value. In a case where the analog signal value of the first PD 711 or the second PD 712 is the predetermined value or more, the CPU 109 executes detection of the color misregistration amount with the use of the second pattern image.

The CPU 109 first detects the amount of light reflected on the front surface of the intermediate transfer belt 5 by the optical sensor 7 (Step S1201). The CPU 109 causes the second LED 702 to emit light. An image is not formed on the intermediate transfer belt 5 at this time, and hence the light from the second LED 702 irradiates the front surface of the intermediate transfer belt 5. The first PD 711 receives the diffused reflected light from the front surface of the intermediate transfer belt 5 to output an analog signal corresponding to the amount of diffused reflected light. The CPU 109 acquires the analog signal from the first PD 711 to detect the amount of light reflected by the front surface of the intermediate transfer belt 5.

The CPU 109 determines whether the acquired amount of light reflected by the front surface of the intermediate transfer belt 5 is the predetermined amount or more (Step S1202). The CPU 109 determines through this processing whether the roughness has proceeded due to the change with time of the front surface of the intermediate transfer belt 5. In the processing of Step S1202, in order to determine whether the amount of reflected light is the predetermined amount or more, the CPU 109 compares the analog signal value of the first PD 711 with a reference value. The reference value is 2.0 V, for example.

In a case where the analog signal value of the first PD 711 is the reference value or more (Step S1202: Y), the CPU 109 determines that the roughness has proceeded due to the change with time of the front surface of the intermediate transfer belt 5. In this case, the CPU 109 detects the color misregistration amount with the second PD 712 with the use of the second pattern images. The CPU 109 transfers pattern image data P2 of the second pattern images to the image forming controller 101, and controls the image forming controller 101 to form the second pattern images on the intermediate transfer belt 5 (Step S1203). The CPU 109 causes the second LED 702 to emit light, and acquires an analog signal from the second PD 712 that has received diffused reflected light of the light to read the second pattern images (Step S1204). In the processing of Step S1204, the CPU 109 acquires the analog signal output from the second PD 712.

The CPU 109 calculates the color misregistration amount from detection results of the second pattern images of the colors of yellow, magenta, cyan, and black to calculate a color misregistration correction amount from the color misregistration amount (Step S1207). The CPU 109 stores the calculated color misregistration correction amount in a memory (not shown). When the image forming apparatus 100 is to form an image on a sheet, the CPU 109 reads the color misregistration correction amount from the memory, and corrects, based on the color misregistration correction amount, image forming positions of images to be formed based on image data.

Meanwhile, in a case where the analog signal value of the first PD 711 is less than the reference value (Step S1202: N), the CPU 109 determines that the roughness due to the change with time of the front surface of the intermediate transfer belt 5 has not proceeded. In this case, the CPU 109 detects the color misregistration amount with the first PD 711 with the use of the second pattern images. The CPU 109 transfers pattern image data P2 of the second pattern images to the image forming controller 101, and controls the image forming controller 101 to form the second pattern images on the intermediate transfer belt 5 (Step S1205). The CPU 109 causes the second LED 702 to emit light, and acquires an analog signal from the first PD 711 that has received diffused reflected light of the light to read the second pattern images (Step S1206). In the processing of Step S1206, the CPU 109 acquires the analog signal output from the first PD 711.

The CPU 109 calculates the color misregistration amount from detection results of the second pattern images of the colors of yellow, magenta, cyan, and black to calculate a color misregistration correction amount from the color misregistration amount (Step S1207). The CPU 109 stores the calculated color misregistration correction amount in a memory (not shown). When the image forming apparatus 100 is to form an image on a sheet, the CPU 109 reads the color misregistration correction amount from the memory, and corrects, based on the color misregistration correction amount, image forming positions of images to be formed based on image data.

As described above, the CPU 109 selects an optimal optical detection path (first PD 711 or second PD 712) depending on the detection result of the roughened state of the front surface of the intermediate transfer belt 5. As a result, the pattern image for detecting the color misregistration is read by an optical configuration of an optimal combination of a light emitting element and a light receiving element. Therefore, the CPU 109 can accurately detect the color misregistration amount and perform accurate color misregistration correction in spite of the change with time of the front surface of the intermediate transfer belt 5.

Image Density Correction

Figure 19:
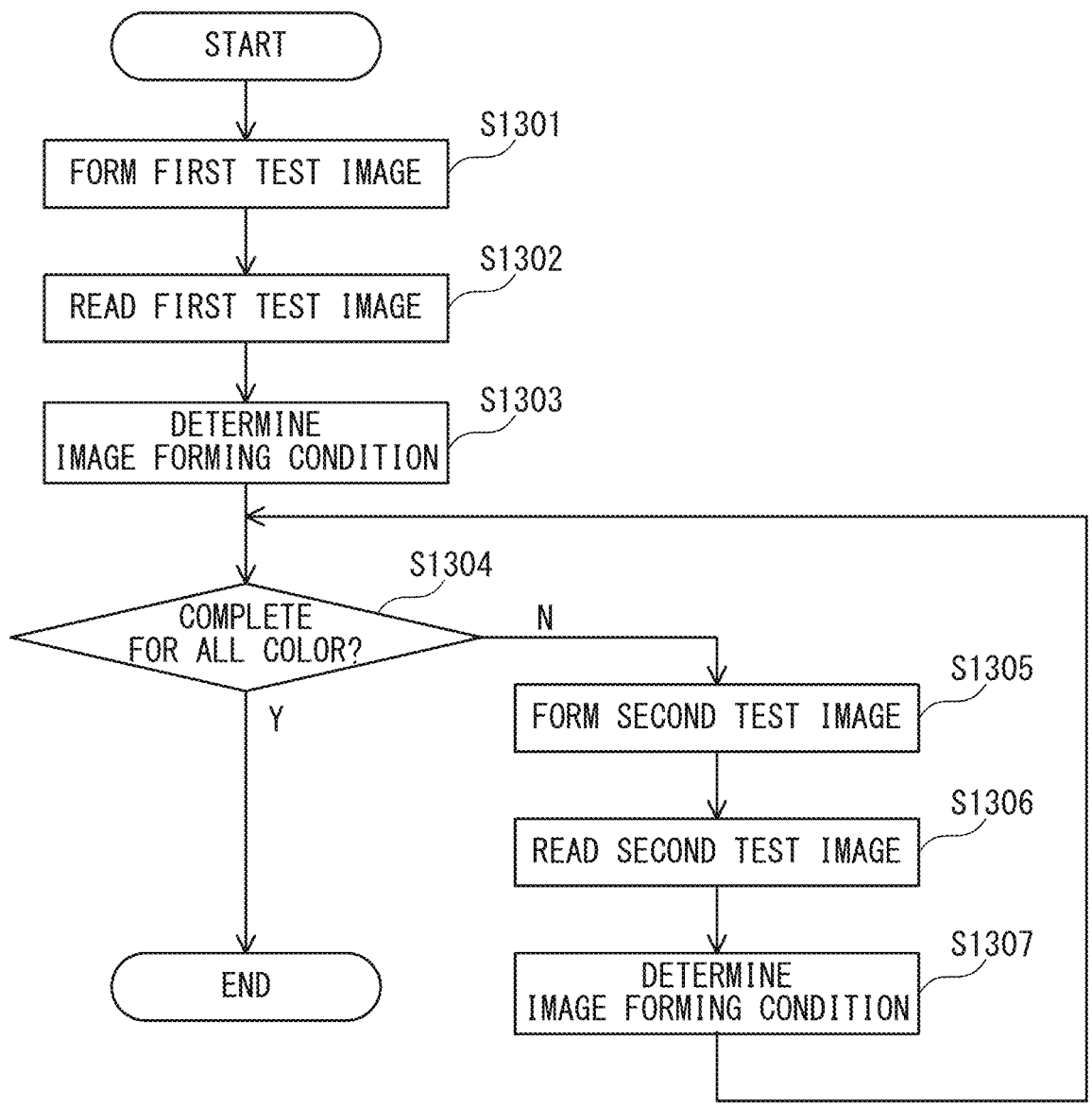
FIG. 19 is a flow chart for illustrating image density detection processing.
Figure 20:
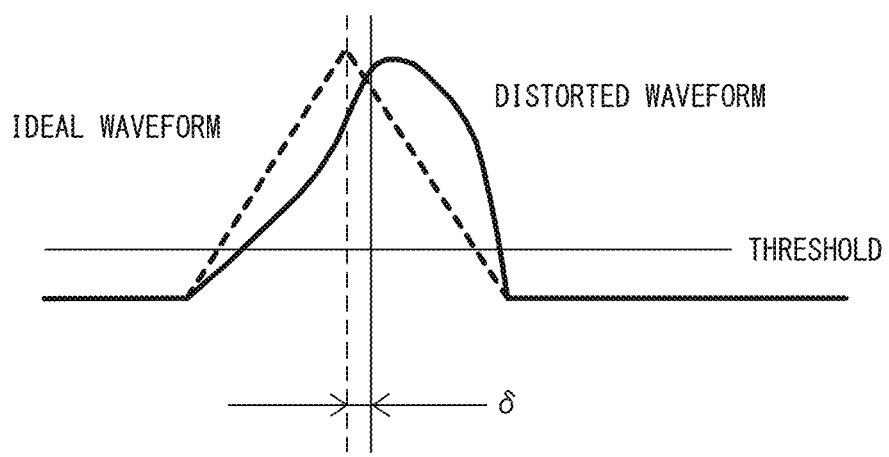
FIG. 20 is an explanatory graph of distortion of a detection waveform.

FIG. 19 is a flow chart for illustrating image density detection processing in at least one embodiment. In at least one embodiment, a description is given of a case in which the image density detection for the chromatic colors is performed after the image density detection for black, but the order may be reversed.

The CPU 109 transfers test image data TK of the first test image to the image forming controller 101, and controls the image forming controller 101 to form the test image of black (first test image) on the intermediate transfer belt 5 (Step S1301). The CPU 109 causes the first LED 701 to emit light, and acquires the analog signal from the first PD 711, which has received the specularly reflected light, to read the test image of black (Step S1302). The CPU 109 converts a level of the analog signal corresponding to the read test image of black into a digital signal value by the A/D converter 110. The CPU 109 determines the image forming condition based on the digital signal value (Step S1303). For example, the CPU 109 calculates a deviation of a density value indicated by the digital signal from a predetermined value, to thereby determine an image forming condition. In Step S1303, the CPU 109 determines, as the image forming condition for black, a correction amount of an intensity of laser light of the exposure device 15d, and stores the correction amount in the memory (not shown). When the black image is to be formed, the CPU 109 reads the correction amount from the memory, and controls the density of the black image to be formed by the image forming unit 10.

After calculating the correction amount of the image density for black, the CPU 109 determines whether the image density detection processing has been performed for all colors of yellow, magenta, and cyan (Step S1304).

In a case where the image density detection has not been performed for all colors (Step S1304: N), the CPU 109 first performs the image density detection for yellow. In other words, the CPU 109 transfers test image data TY of the test image (second test image) of yellow to the image forming controller 101, and controls the image forming controller 101 to form the test image of yellow (second test image) on the intermediate transfer belt 5 (Step S1305). The CPU 109 causes the second LED 702 to emit light, and acquires the analog signal from the second PD 712, which has received the diffused reflected light, to read the test image of yellow (Step S1306). The CPU 109 converts a level of the analog signal corresponding to the read test image of yellow into a digital signal value by the A/D converter 110. The CPU 109 determines the image forming condition based on the digital signal value (Step S1307). For example, the CPU 109 calculates a deviation of a density value indicated by the digital signal from the predetermined value, to thereby determine an image forming condition. In Step S1307, the CPU 109 determines, as the image forming condition for yellow, a correction amount of an intensity of laser light of the exposure device 15*a*, and stores the correction amount in the memory (not shown). When the yellow image is to be formed, the CPU 109 reads the correction amount from the memory, and controls the density of the yellow image to be formed by the image forming unit 10.

The CPU 109 repeatedly performs the processing of Step S1305 to Step S1307 until the image density detection is ended for all colors. When the image density detection has been performed for all colors of yellow, magenta, and cyan (Step S1304: Y), the CPU 109 ends the image density detection processing.

As described above, the CPU 109 uses the test image (first test image, second test image) for the image density detection corresponding to the color to be detected to acquire the image density with an optimal combination of a light emitter and a light receiver. Therefore, the CPU 109 can detect a correction amount of an accurate image density to perform accurate image density correction.

As described above, the image forming apparatus 100 according to at least one embodiment includes the optical sensor 7 having elements bonded on the same substrate 201 by die bonding and wire bonding. When detecting the color misregistration amount, the image forming apparatus 100 detects the roughened state of the front surface of the intermediate transfer belt 5, and determines the optimal optical detection path depending on the roughened state. For that purpose, the image forming apparatus 100 can read the pattern image for detecting the color misregistration with the optimal combination of a light emitting element and a light receiving element. Therefore, even when the front surface of the intermediate transfer belt 5 as the transfer member has changed with time, the image forming apparatus 100 can accurately detect the color misregistration amount, and hence perform highly-accurate color misregistration correction. In this manner, according to at least one embodiment of the present disclosure, the detection image can be detected with the optimal combination of a light emitting element and a light receiving element depending on the change in state of the front surface of the transfer member.

In other words, in a case where the front surface of the intermediate transfer belt 5 is in a good state before the change with time, the image forming apparatus 100 performs the specular reflection color misregistration detection with the use of the first pattern images by the first LED 701 and the first PD 711. In a case where the front surface of the intermediate transfer belt 5 has changed with time to be reduced in gloss, the image forming apparatus 100 performs the diffused reflection color misregistration detection with the use of the second pattern images by the second LED 702 and the first PD 711. When the front surface of the intermediate transfer belt 5 has further changed with time to be roughened, the image forming apparatus 100 performs the diffused reflection color misregistration detection with the use of the second pattern images by the second LED 702 and the second PD 712. By detecting the color misregistration amount with the above-mentioned combinations, the image forming apparatus 100 can accurately detect the color misregistration amount, and hence perform highly-accurate color misregistration correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-012075, filed Jan. 28, 2019, which is hereby incorporated by reference herein in its entirety.

What is claimed is:

1. An image forming apparatus, comprising:
an image forming unit configured to form images of different colors;
a transfer member, to which the images formed by the image forming unit are to be transferred;
a transfer unit configured to transfer the images from the transfer member onto a sheet;
a sensor configured to detect reflected light from a detection image formed on the transfer member; and
a controller configured to control the image forming unit to form detection images of the different colors, control the sensor to detect the reflected light from the detection images on the transfer member, detect a color misregistration of the detection images of the different colors based on a result of detecting the reflected light by the sensor, and control relative positions of images of the different colors to be formed by the image forming unit based on the color misregistration,
wherein the sensor includes a light emitting element configured to emit light for irradiating the detection images at a predetermined angle of incidence, a first light receiving element arranged at a position at which diffused reflected light from the detection images is received at a first angle of reflection, and a second light receiving element arranged at a position at which the diffused reflected light from the detection images is received at a second angle of reflection,
wherein the first angle of reflection is less than the predetermined angle of incidence,
wherein the second angle of reflection is less than the predetermined angle of incidence,
wherein the second angle of reflection is less than the first angle of reflection, and
wherein the controller is configured to select, based on information related to a state of the transfer member, a light receiving element for use in detecting the diffused reflected light from the detection images from among the first light receiving element and the second light receiving element.

2. The image forming apparatus according to claim 1, wherein the controller is configured to control the sensor to detect reflected light from the transfer member, and select the light receiving element for use in detecting the color misregistration amount from among the first light receiving element and the second light receiving element, based on a result of detecting the reflected light from the transfer member.

3. The image forming apparatus according to claim 1, wherein the controller is configured to control the light emitting element to emit the light, acquire a result of receiving reflected light from the transfer member by the first light receiving element, and select the light receiving element for use in detecting the color misregistration amount based on the result of receiving the reflected light from the transfer member by the first light receiving element.

4. The image forming apparatus according to claim 3, wherein the controller is configured to control the light emitting element to emit the light, acquire a signal value corresponding to a result of receiving the reflected light from the transfer member by the first light receiving element, and select the first light receiving element in a case where the signal value is less than a reference value.

5. The image forming apparatus according to claim 3, wherein the controller is configured to control the light emitting element to emit the light, acquire a signal value corresponding to a result of receiving the reflected light from the transfer member by the first light receiving element, and select the second light receiving element in a case where the signal value is equal to or greater than a reference value.

6. The image forming apparatus according to claim 1,
wherein the sensor further includes another light emitting element configured to irradiate the transfer member with light, and
wherein the first light receiving element is arranged at a position at which the first light receiving element is able to receive specularly reflected light of light emitted from the other light emitting element.

7. The image forming apparatus according to claim 6, wherein the controller is configured to:
control the other light emitting element to emit the light, acquire a signal value corresponding to a result of receiving specularly reflected light from the transfer member by the first light receiving element, and control the image forming unit to form another detection image in a case where the signal value is equal to or greater than a predetermined value; and
control the other light emitting element to emit the light, acquire a result of receiving specularly reflected light from the other detection image by the first light receiving element, and acquire the color misregistration amount based on the result of receiving the specularly reflected light from the other detection image by the first light receiving element.

8. The image forming apparatus according to claim 6, wherein the controller is configured to:
control the light emitting element to emit the light, acquire a signal value corresponding to a result of receiving diffused reflected light from the transfer member by the first light receiving element, and control the image forming unit to form another detection image in a case where the signal value is less than a predetermined value; and
control the other light emitting element to emit the light, acquire a result of receiving specularly reflected light from the other detection image by the first light receiving element, and acquire the color misregistration amount based on the result of receiving the specularly reflected light from the other detection image by the first light receiving element.

9. The image forming apparatus according to claim 6, wherein the controller is configured to:
control the light emitting element to emit the light, acquire a signal value corresponding to a result of receiving diffused reflected light from the transfer member by the second light receiving element, and control the image forming unit to form another detection image in a case where the signal value is less than a predetermined value; and
control the other light emitting element to emit the light, acquire a result of receiving specularly reflected light from the other detection image by the first light receiving element, and acquire the color misregistration amount based on the result of receiving the specularly reflected light from the other detection image by the first light receiving element.

* * * * *